US010587746B2

(12) United States Patent  
Celik et al.

(10) Patent No.: US 10,587,746 B2  
(45) Date of Patent: *Mar. 10, 2020

(54) AUTOMATED MESSAGING

(71) Applicant: OnePIN, Inc., Westborough, MA (US)

(72) Inventors: Feyzi Celik, Hopkinton, MA (US); Marcin Nowak, Westborough, MA (US); Chris Degrace, Hopkinton, MA (US)

(73) Assignee: OnePIN, Inc., Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/380,899

(22) Filed: Apr. 10, 2019

(65) Prior Publication Data

US 2019/0238674 A1 Aug. 1, 2019

Related U.S. Application Data

(63) Continuation of application No. 15/389,469, filed on Dec. 23, 2016, now Pat. No. 10,298,740, which is a (Continued)

(51) Int. Cl.
*H04M 1/725* (2006.01)
*H04W 4/12* (2009.01)
*H04M 1/663* (2006.01)

(52) U.S. Cl.
CPC ... *H04M 1/72552* (2013.01); *H04M 1/72519* (2013.01); *H04W 4/12* (2013.01); *H04M 1/663* (2013.01); *H04M 1/72583* (2013.01)

(58) Field of Classification Search
CPC ......... H04M 1/72552; H04M 1/72519; H04M 1/663; H04M 1/72583; H04W 4/12
See application file for complete search history.

(56) References Cited

U.S. PATENT DOCUMENTS 8,073,460 B1 12/2011 Scofield
8,175,921 B1 5/2012 Kopra
(Continued)

FOREIGN PATENT DOCUMENTS

| GB | 2454576 | 5/2009 |
| WO | 2009023591 | 2/2009 |
| WO | 2014049322 | 4/2014 |

OTHER PUBLICATIONS

International Search Report and Written Opinion, dated May 1, 2015, International Application No. PCTUS2015/010860, filed Jan. 9, 2015, 17 pages.

(Continued)

*Primary Examiner* — Lisa Hashem
(74) *Attorney, Agent, or Firm* — David A. Giordano; Giordano Law LLC

(57) ABSTRACT

Techniques for automatically prompting a calling user to send a message to a called user, the calling user using a calling device and the called user using a called device, the method including receiving, at a processor in the calling device, an indication that a call from the calling device to the called device has disconnected, determining, at the processor in the calling device, whether the call connected before receiving the indication that the call has disconnected, and in response to determining that the call did not connect before receiving the indication that the call has disconnected, determining that the call was a missed call.

12 Claims, 9 Drawing Sheets

Related U.S. Application Data continuation of application No. 14/593,724, filed on Jan. 9, 2015, now Pat. No. 9,565,537.

(60) Provisional application No. 61/926,120, filed on Jan. 10, 2014.

(56) References Cited

U.S. PATENT DOCUMENTS

| | | | |
|---|---|---|---|
| 8,249,627 | B2 | 8/2012 | Olincy |
| 8,712,371 | B2 | 4/2014 | Baker et al. |
| 8,971,860 | B1 | 3/2015 | Olincy |
| 8,989,712 | B2 | 3/2015 | Wentker et al. |
| 2002/0101963 | A1* | 8/2002 | Contractor ........ H04M 3/53308 379/88.25 |
| 2002/0159387 | A1 | 10/2002 | Allison |
| 2004/0252816 | A1 | 12/2004 | Nicolas |
| 2004/0267884 | A1* | 12/2004 | Sar-Shalom ...... H04M 1/72547 709/206 |
| 2005/0186939 | A1 | 8/2005 | Barnea et al. |
| 2005/0233733 | A1 | 10/2005 | Roundtree |
| 2005/0289095 | A1 | 12/2005 | Ruahala |
| 2006/0222152 | A1 | 10/2006 | Elias et al. |
| 2006/0271425 | A1 | 11/2006 | Goodman |
| 2006/0285661 | A1 | 12/2006 | Patel |
| 2007/0055995 | A1 | 3/2007 | Jiang |
| 2007/0106698 | A1 | 5/2007 | Elliott |
| 2007/0111748 | A1 | 5/2007 | Risbood |
| 2007/0133771 | A1 | 6/2007 | Stifleman et al. |
| 2007/0280457 | A1* | 12/2007 | Aberethy ............. H04M 1/575 379/201.01 |
| 2007/0281689 | A1 | 12/2007 | Altman |
| 2008/0090597 | A1 | 4/2008 | Celik |
| 2008/0261635 | A1 | 10/2008 | Samiri |
| 2008/0318554 | A1 | 12/2008 | Romppanen |
| 2009/0265220 | A1 | 10/2009 | Bayraktar |
| 2009/0280786 | A1 | 11/2009 | Ziklik |
| 2010/0100387 | A1 | 4/2010 | Kuiken |
| 2010/0325221 | A1 | 12/2010 | Cohen |
| 2011/0029380 | A1 | 2/2011 | Moukas |
| 2011/0076989 | A1 | 3/2011 | Lynch |
| 2011/0131421 | A1 | 6/2011 | Jogand-Coulomb et al. |
| 2011/0151838 | A1* | 6/2011 | Olincy .................... H04M 1/64 455/412.1 |
| 2011/0151852 | A1* | 6/2011 | Olincy ............. H04M 1/72552 455/418 |
| 2011/0287746 | A1 | 11/2011 | Gopinath |
| 2012/0057689 | A1 | 3/2012 | Martin |
| 2012/0101989 | A1 | 4/2012 | Ring |
| 2012/0238251 | A1 | 9/2012 | Lee |
| 2012/0315880 | A1 | 12/2012 | Peitrow |
| 2013/0086618 | A1 | 4/2013 | Klein et al. |
| 2013/0111365 | A1 | 5/2013 | Chen et al. |
| 2013/0115872 | A1 | 5/2013 | Huang |
| 2013/0130661 | A1 | 5/2013 | Berner et al. |
| 2013/0217360 | A1 | 8/2013 | Dakin |
| 2013/0238706 | A1 | 9/2013 | Desai |
| 2013/0290820 | A1 | 10/2013 | Dhanani |
| 2013/0294443 | A1 | 11/2013 | Kahn |
| 2014/0007214 | A1 | 1/2014 | Qureshi et al. |
| 2014/0026069 | A1 | 1/2014 | Dennis |
| 2014/0057610 | A1 | 2/2014 | Olincy |
| 2014/0156386 | A1 | 6/2014 | Williams |
| 2014/0188612 | A1 | 7/2014 | Chou et al. |
| 2014/0199960 | A1 | 7/2014 | Kahn |
| 2014/0229238 | A1 | 8/2014 | Meyer et al. |
| 2014/0229277 | A1 | 8/2014 | Khambete |
| 2014/0257985 | A1 | 9/2014 | Gibson et al. |
| 2014/0304068 | A1 | 10/2014 | Weinblatt |
| 2014/0329565 | A1 | 11/2014 | Mannix et al. |
| 2015/0019307 | A1 | 1/2015 | Girard et al. |
| 2015/0073891 | A1 | 3/2015 | Dauneria |
| 2015/0079951 | A1 | 3/2015 | Kosatka-Pioro et al. |
| 2015/0149301 | A1 | 5/2015 | Dow |
| 2015/0201313 | A1 | 7/2015 | Celik et al. |
| 2017/0048372 | A1* | 2/2017 | Huang ................ H04M 1/7253 |
| 2017/0109011 | A1 | 4/2017 | Jiang |
| 2017/0142258 | A1 | 5/2017 | Seyfetdinov |
| 2017/0208163 | A1* | 7/2017 | Paul ...................... H04M 1/645 |
| 2017/0230495 | A1* | 8/2017 | Gupta ............. H04M 1/274558 |

OTHER PUBLICATIONS

International Search Report and Written Opinion, dated Jun. 3, 2016, International Application No. PCT/US2016/013112, filed Jan. 12, 2016, 15 pages.

International Search Report and Written Opinion, dated Aug. 11, 2016, International Application No. PCT/US2016/30634, filed May 4, 2016, 15 pages.

International Search Report and Written Opinion, dated Aug. 11, 2016, International Application No. PCT/US2016/30664, filed May 4, 2016, 15 pages.

International Search Report and Written Opinion, dated Aug. 12, 2016, International Application No. PCT/US2016/30612, filed May 3, 2016, 19 pages.

International Search Report and Written Opinion, dated Aug. 12, 2016, International Application No. PCT/US2016/30699, filed May 4, 2016, 15 pages.

International Search Report and Written Opinion, dated Sep. 16, 2016, International Application No. PCT/US2016/30764, filed May 4, 2016, 13 pages.

International Search Report and Written Opinion, dated Aug. 18, 2016, International Application No. PCT/US2016/30859, filed May 4, 2016, 12 pages.

International Search Report and Written Opinion, dated Jul. 25, 2016, International Application No. PCT/US2016/21540, filed Mar. 9, 2016, 17 pages.

* cited by examiner

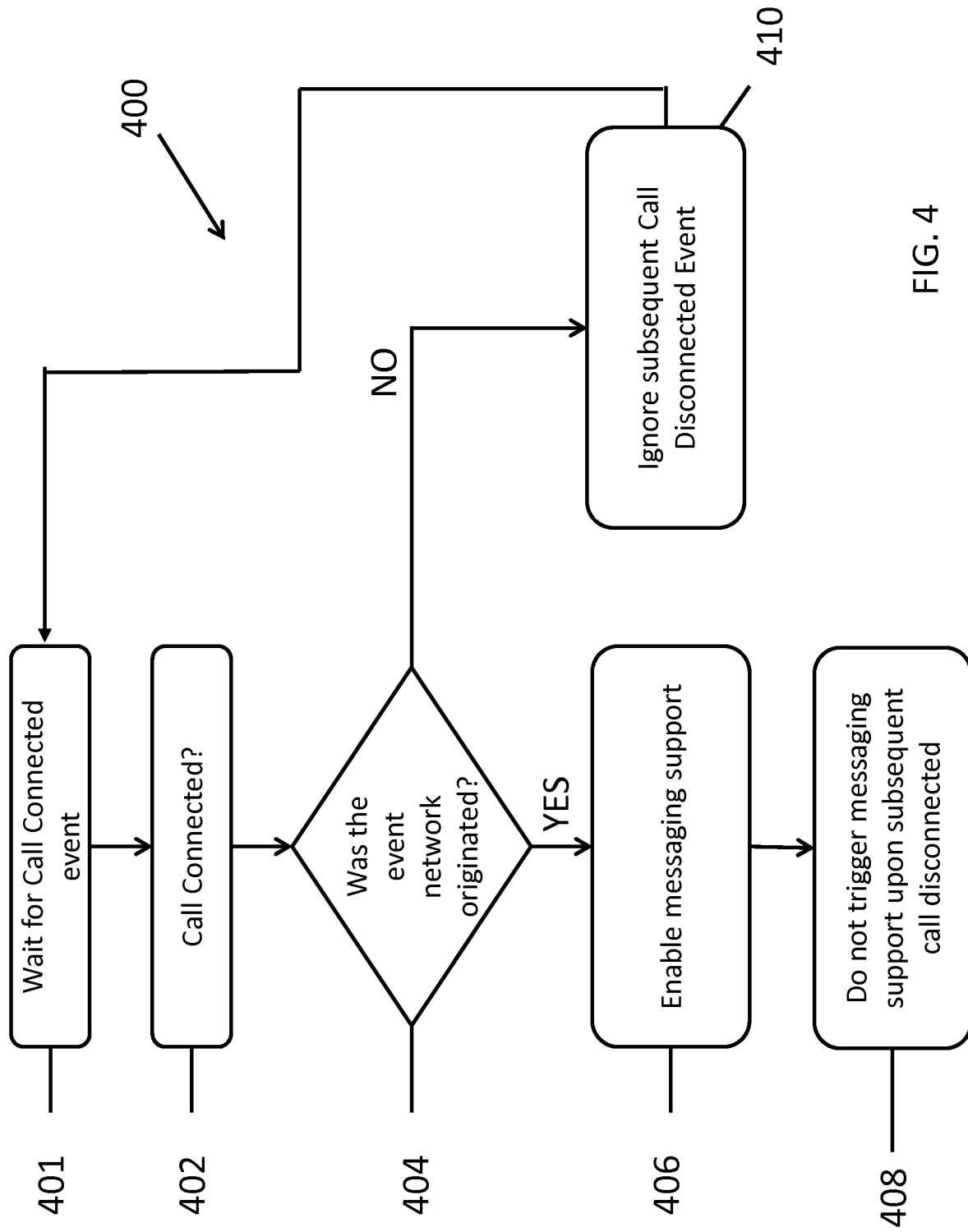

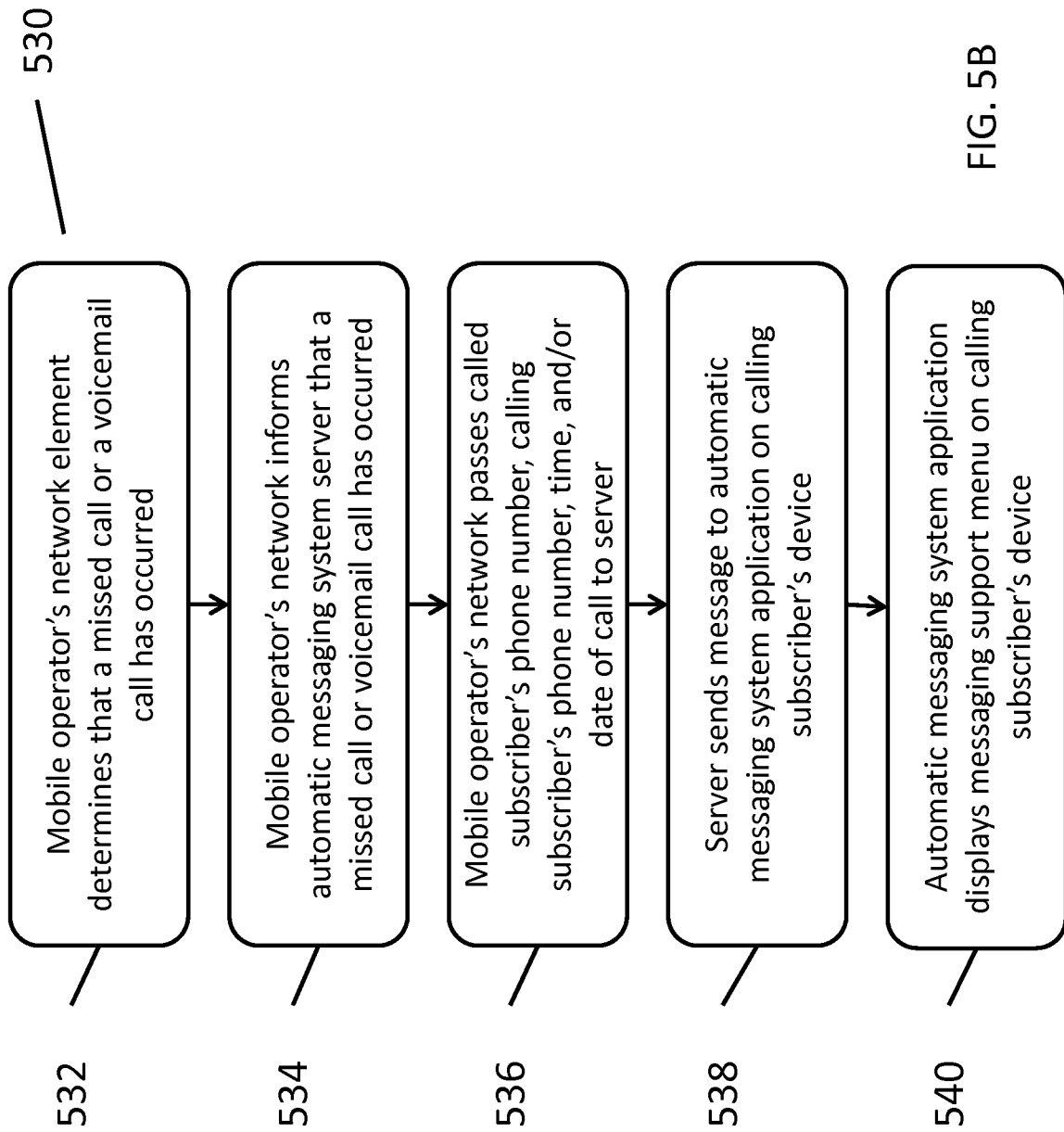

US 10,587,746 B2

AUTOMATED MESSAGING

CROSS-REFERENCE TO RELATED APPLICATIONS

This application is a continuation of U.S. application Ser. No. 15/389,469, now U.S. Pat. No. 10,298,740, filed Dec. 23, 2016, which application is a continuation of U.S. application Ser. No. 14/593,724, now U.S. Pat. No. 9,565,537, filed Jan. 9, 2015, which claims priority to U.S. Provisional Patent Application No. 61/926,120, filed Jan. 10, 2014. The entire contents of those applications are incorporated herein by reference.

BACKGROUND

Many people today make and receive phone calls on mobile devices that also have messaging capabilities. Often, when a first person calls a second person, the second person will not answer the phone because the second user is busy and/or wants to ignore the caller. While a caller or callee can send a follow up written message such as a text or e-mail to the other party, doing so can be time consuming because it requires multiple steps including creating a new message, typing the message, and sending the message.

SUMMARY

Certain embodiments disclosed herein generally relate to a messaging system that can enable mobile subscribers to automatically send messages to people they have called or received calls from, preferably in the circumstance where a call is terminated without a connection (e.g., where the call recipient did not answer the call). For example, the automated messaging system can automatically detect that a calling subscriber has called a called subscriber, and that the called subscriber did not answer the call. After the calling subscriber ends the phone call attempt (and/or the call is otherwise terminated), the automated messaging system can automatically prompt the calling subscriber, and provide several messaging options. For example, the options presented to the calling subscriber can include both preset messages ("canned messages") as well as customizable messages edited or written by the subscriber. In other embodiments, the system can work in a similar manner when a called user ignores or misses a phone call. For example, if a called subscriber does not answer a phone call, the called subscriber can be automatically presented with a list of text messages to send to the calling subscriber. In either instance, the user can create and send a message by pressing a single button.

The automated messaging system is preferably used with a mobile phone, but can also be used with other devices that can be configured to make phone calls. For example, tablets and other computers that include Skype or Google Voice can also make use of the automated messaging system.

One embodiment of the system described herein is referred to as MessageXpress (or MsgXpress) being developed by OnePIN, Inc. of Westborough, Mass. However, other names/embodiments of the service described herein are within the scope of the disclosed subject matter.

In general, in an aspect, some embodiments of the present disclosure are directed at a computer-implemented method for automatically prompting a calling user to send a message to a called user, the calling user using a calling device and the called user using a called device. The method can comprise receiving, at a processor in the calling device, an indication that a call from the calling device to the called device has disconnected. The method can further comprise determining, at the processor in the calling device, whether the call connected before receiving the indication that the call has disconnected. In response to determining that the call did not connect before receiving the indication that the call has disconnected, the method can comprise determining that the call was a missed call.

In some embodiments, the method can further comprise, in response to determining that the call was a missed call, at least some of the following steps: (i) automatically prompting on a display of the calling device a menu having a plurality of selectable menu items, at least some of the selectable menu items corresponding to respective stored phrases; (ii) receiving, at the processor, user input from the calling user selecting one of the selectable menu items; and (iii) sending a message from the calling device to the called device including the stored phrase corresponding to the selected menu item.

In some embodiments, the method can further comprise in response to determining that the call connected to the called user before receiving the indication that the call has disconnected, preventing the menu from being displayed.

In some embodiments, the method can further comprise changing the menu based on instructions received from an automated messaging system server by performing at least one of adding a selectable menu item, deleting a selectable menu item, editing a selectable menu item, and editing at least one of the stored phrases.

In some embodiments, the method can further comprise receiving, at the processor in the calling device, user input indicating that the calling user desires to customize at least one of the stored phrases. The method can also further comprise receiving, at the processor in the calling device, user input including desired changes to at least one of the respective stored phrases; and storing, at a memory coupled to the processor in the calling device, the desired changes.

In some embodiments, the method can further comprise determining, at the processor in the calling device, whether the calling device is capable of detecting a network originated call connected event.

In general, in another aspect, some embodiments of the present disclosure are directed at a device comprising a processor, a display coupled to the processor, a non-transitory storage memory coupled to the processor having a record of previous call events, and an automated messaging module implemented using the processor. The automated messaging module can be configured to receive an indication from the processor that a call from the device to a called device has disconnected, determine, using the record of previous call events, whether the call connected before receiving the indication that the call has disconnected, and in response to determining that the call did not connect before receiving the indication that the call has disconnected, determine that the call was a missed call.

In some embodiments, the automated messaging module can be further configured to, in response to determining that the call was a missed call, perform at least some of the following actions: (i) automatically prompt on the display a menu having a plurality of selectable menu items, at least some of the selectable menu items corresponding to respective stored phrases, (ii) receive user input selecting one of the selectable menu items, and (iii) send a message from the device to the called device including the stored phrase corresponding to the selected menu item.

In some embodiments, the automated messaging module can be further configured to, in response to determining that the call connected to the called device, prevent the menu from being displayed.

In some embodiments, the automated messaging module can be further configured to change the menu based on instructions received from an automated messaging system server by performing at least one of adding a selectable menu item, deleting a selectable menu item, editing a selectable menu item, and editing at least one stored phrases.

In some embodiments, the automated messaging system application can be further configured to receive user input indicating that the user desires to customize at least one of the respective stored phrases, receive user input including desired changes to at least one of the stored phrases, and store in the storage memory the desired changes.

In some embodiments, the automated messaging module can be further configured to determine whether the device is capable of detecting a network originated call connected event.

In general, in yet another aspect, some embodiments of the present disclosure are directed at a computer-implemented method for automatically prompting a calling user to send a message to a called user, the calling user using a calling device and the called user using a called device. The method can comprise receiving, at a processor in the calling device, an indication that a call from the calling device to the called device was a missed call. In response to receiving the indication, the method can comprise at least some of the following steps: (i) automatically prompting on a display of the calling device a menu having a plurality of selectable menu items, at least some of the selectable menu items corresponding to respective stored phrases, (ii) receiving, at the processor, user input from the calling user selecting one of the selectable menu items, and (iii) sending a message from the calling device to the called device including the stored phrase corresponding to the selected menu item.

In some embodiments, the indication can be received from an automated messaging system server.

In some embodiments, the method can further comprise changing the menu based on instructions received from an automated messaging system server by performing at least one of adding a selectable menu item, deleting a selectable menu item, editing a selectable menu item, and editing at least one of the stored phrases.

In some embodiments, the method can further comprise receiving, at the processor in the calling device, user input indicating that the calling user desires to customize at least one of the stored phrases. The method can also further comprise receiving, at the processor in the calling device, user input including desired changes to at least one of the respective stored phrases. The method can also comprise storing, at a memory coupled to the processor, the desired changes.

In some embodiments, the method can comprise determining, at the automated messaging system server, whether the call was a missed call based on information received from a mobile operator's network.

In some embodiments, the indication can comprise at least one of a binary SMS message, a USSD command, and a class 2 regular SMS message.

In some embodiments, the missed call can include at least one of a call that was answered by voicemail prior to connection and a call that was intercepted by the carrier prior to connection.

In general, in still another aspect, some embodiments of the present disclosure are directed at a device comprising a processor, a network interface coupled to the processor, a display coupled to the processor, and an automated messaging module implemented using the processor. The automated messaging module can be configured to receive an indication from the network interface that a call from the device to a called device was a missed call. In response to receiving the indication, the automated messaging module can be configured to automatically prompt on the display a menu having a plurality of selectable menu items, at least some of the selectable menu items corresponding to respective stored phrases; receive user input selecting one of the selectable menu items; and send a message from the device to the called device including the stored phrase corresponding to the selected menu item.

In some embodiments, the indication can be received from an automated messaging system server.

In some embodiments, the automated messaging module can be further configured to change the menu based on instructions received from an automated messaging system server by performing at least one of adding a selectable menu item, deleting a selectable menu item, editing a selectable menu item, and editing at least one stored phrases.

In some embodiments, the automated messaging module can be further configured to receive user input indicating that the user desires to customize at least one of the stored phrases; receive user input including desired changes to at least one of the respective stored phrases; and store in a storage memory the desired changes.

In some embodiments, the indication comprises at least one of a binary SMS message, a USSD command, and a class 2 regular SMS message.

In some embodiments, the missed call can include at least one of a call that was answered by voicemail prior to connection and a call that was intercepted by the carrier prior to connection.

Possible benefits of the automated messaging system for the called subscriber can include:

Instant Notification: The called party can receive an instant notification (e.g., an SMS message) that someone has called. The called party can quickly and easily see who called and when they called without having to listen to a voicemail or navigate to a "missed call" list. The called party knows who called (both the name and phone number can be displayed) even if the called party does not have this contact in his or her phonebook. Not having to listen to a voicemail is can be a significant benefit as dialing a voicemail system takes time and the time spent listening to messages can count against a subscribers' minute balance.

Relevance: The called party can receive important information, such as the name of the caller (e.g., John Smith) and the time of the call (e.g., 9:15 AM).

Increased social connection: The called party can easily call the calling party back by clicking on the phone number without typing the number.

Possible benefits of the automated messaging system for the calling subscriber can include:

Simplicity: The calling party can send a message to the called party automatically without any typing.

Customization: The calling party can save predetermined messages that he or she frequently sends to contacts after unanswered calls. These customized predetermined messages can be automatically presented to the calling party after a call attempt.

Possible benefits of the automated messaging system for mobile operators can include:

Increased Voice I SMS Usage (Higher ARPU) and Reduced Churn: More return calls can be made, because the original called subscriber knows who called. For example, the called subscriber can receive a name and not merely a phone number. This additional information can lead to an increased call back rate.

In general, most mobile calls result in a phone conversation. However, there is a percentage of calls where the call is not answered and these calls are dubbed "Missed Calls". Missed calls can happen for a variety of reasons. For example, the called subscriber might have switched off their phone, the called subscriber may be in a geographic area where there is no mobile network coverage, and/or the called subscriber may decide not to answer the call. Missed calls can be a source of lost revenue for mobile operators. The automated messaging system can personalize the missed calls by providing detailed contact information and times when the missed call occurred. These messages can create new calls or SMS messages as a follow up to the initial call. The automated messaging system can personalize the automatically generated messages by providing, for example, names of the calling subscriber and can increase the likelihood of the called subscriber calling back the calling subscriber.

Embodiments of the subject matter described herein can also provide at least the following benefits:

The techniques described herein can provide enhanced information (e.g., more than basic information) relating to the missed call. For example, the automated messaging system can provide to the message recipient a personalized message, with a personal name included, which can reduce the likelihood that the message is interpreted by the called subscriber as "spam" or uninformative. Also, the messages can be generated by an application on the calling subscriber's mobile device or the called subscriber's mobile device, rather than on the mobile network itself, thus reducing the overall complexity of the system needed to implement the techniques described herein.

The techniques described herein can assist the calling subscriber, and not only the receiving subscriber. For example, the automated messaging system allows the calling subscriber to be automatically prompted to send a message to the called subscriber in addition to the other way around.

DESCRIPTION OF THE FIGURES

FIG. 4 is a flowchart illustrating an exemplary process by which an automated messaging system application can check whether the mobile device on which it is installed has the capability to understand a Network Originated call connected event.

FIG. 5 B is a flowchart illustrating an exemplary process by which an automated messaging system application can determine whether or not to display a messaging menu using information provided by the mobile operator network.

DETAILED DESCRIPTION

Embodiments of the disclosed subject matter can provide a messaging system that can enable mobile subscribers to automatically send written messages to people they have called and/or received call from, preferably in the circumstance where a call is terminated without a connection (e.g., where the call recipient did not answer the call). The automated messaging system can automatically detect that a calling subscriber has called a called subscriber, and that the called subscriber did not answer the call. After the calling subscriber ends the phone call attempt (and/or the call is otherwise terminated), the automated messaging system can automatically prompt the calling and/or called subscriber, and provide several messaging options. For example, the options presented to the subscriber can include both preset messages ("canned messages") as well as customizable messages edited or written by the subscriber. In some embodiments, the system can work in a similar manner when a user ignores or misses a phone call. For example, if a called subscriber does not answer a phone call, the called subscriber can be automatically presented with a list of text messages to send to the calling subscriber. Other embodiments are within the scope of the disclosed subject matter.

Figure 1:
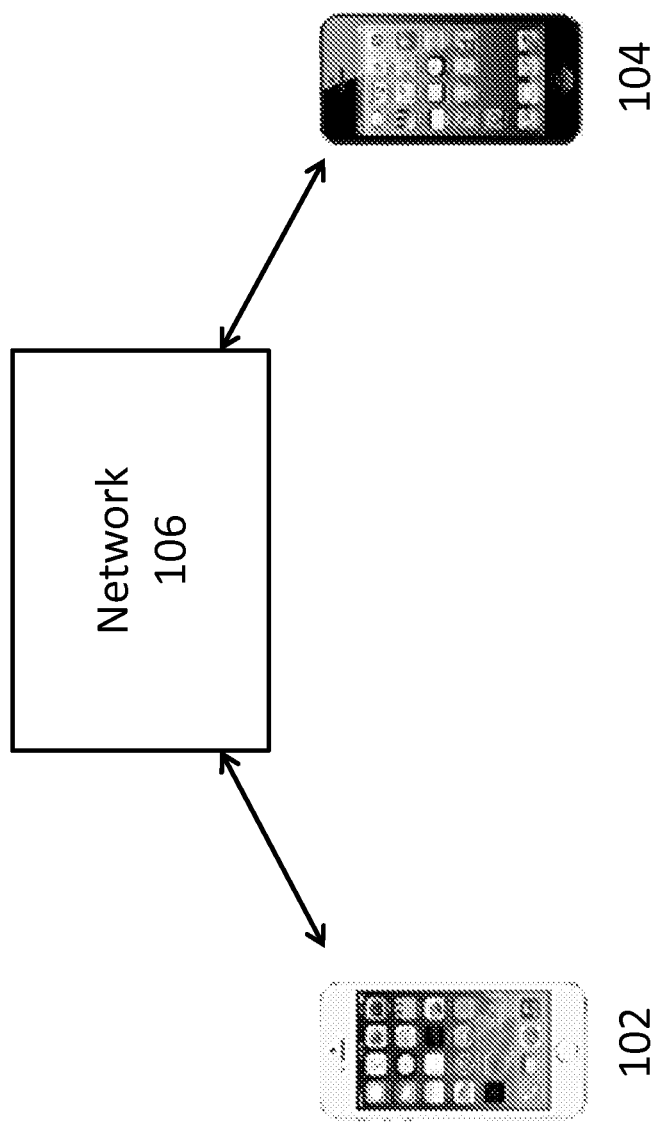
FIG. 1 is a logical block diagram showing an exemplary mobile phone system in which an automated messaging system can operate.

FIG. 1 shows an exemplary mobile phone system in which the automated messaging system can operate. FIG. I includes a first subscriber's (e.g., a calling subscriber's) mobile device 102, a second subscriber's (e.g., a called subscriber's) mobile device 104, and a network 106. The first subscriber (e.g., John) can place calls from mobile device 102 to the second subscriber's (e.g., Jill's) mobile device 104 via network 106. Similarly, the second subscriber (e.g., Jill) can place calls from mobile device 104 to the first subscriber's (e.g., John's) mobile device 102 via network 106. Each of the mobile devices 102 and 104 can also be configured to send/receive texts and send/receive data such as e-mails, webpages, and video data. The mobile devices 102 and 104 can be any communication device such as a mobile phone (e.g., APPLE IPHONE, SAMSUNG GALAXY, MOTOROLA MOTO), and/or a tablet (e.g., APPLE IPAD, MICROSOFT SURFACE, AMAZON KINDLE). Lastly, while the specification herein focuses on "mobile" devices, this not required. For example, the techniques described herein can also apply to non-mobile devices such as desktop computers.

In some embodiments, network 106 can be a wireless cellular or data network maintained by a mobile operator, and can comprise multiple sub-networks and back-end servers. For example, the network 106 can include base stations (eNodeBs), a voice network for handling voice calls and texts, a packet switched network for handling mobile data, backhaul networks, messaging servers, etc. Exemplary versions of the network 106 can be provided by, for example, Verizon, AT&T, T-Mobile, INWI, Vodafone, Claro, and Orange.

The following example shows one operation of the automated messaging system. John calls Jill from his mobile device 102. Jill's mobile device 104 rings. Jill is busy; she does not answer the call. On the screen of John's mobile device 102, the following list of message phrases can automatically appear after the call attempt ends (e.g., without any action by John):

Send A Message:
Call me back
I will be late
I am waiting
Where are you?
New message
Customize (e.g., mobile subscribers can change these messages and enter their own text)

In some embodiments each of the potential messages can be displayed as a user-selectable button on the interface of the mobile device. In this manner, a user can automatically create and send a message containing the selected phrase by simply tapping on the selected phrase.

Continuing with the example, assume that John chooses "Call me back" to send in a message. The automated messaging system can then send an automated message to Jill without any additional information from John. When Jill has a chance to look at her phone 104, she will see on her mobile device screen that she has a new message, which reads as:

"I called you at 9:15 AM, could not reach you.
Please call me back.
John Smith
+1 (508) 555-5555"

As is described more fully below, the original phrase selected by John can be supplemented with the additional information shown above.

In some embodiments, this message is sent as an SMS message (commonly known as a text message) from John's mobile device 102 to Jill's mobile device 104, although other messaging types can also be used. For example, John's mobile device 102 can be configured to send an SMS message, an e-mail, send an instant message, send an MMS message, send a Facebook message, Tweet a message (e.g., via Twitter), send an iMessage, post a message on Jill's Facebook page, leave a voicemail, send a snapchat message, etc. The message can be sent directly from the automated messaging system application itself and/or can involve the use of third-party applications installed on the phone (e.g., the automated messaging system can cause a Facebook application installed on the phone to send a message).

The automated messaging system can comprise an application that is obtained and installed on a user's mobile device (e.g., mobile device 102 and 104) as well as one or more servers configured to communicate and interact with the application's installed on the mobile device. These one or more servers can be part of network 106 or elsewhere. The automated messaging system can be implemented on servers maintained and operated by a wireless network operator that maintains the network 106. Additionally, the automated messaging system can be implemented on servers maintained and operated by a third party (e.g., a separate entity than the entity that maintains network 106). As another option, the automated messaging system can be implemented on a "cloud" network, in which the server portion of the automated messaging system is implemented as a set of virtual software instances running on a set of shared, distributed hardware resources.

The automated messaging system can also be implemented entirely on a stand-alone automated messaging system application installed on a subscriber's mobile device. In such embodiments, the automated messaging system does not require any back-end servers beyond that required for normal message and data exchange between any two subscriber's mobile devices.

Figure 2:
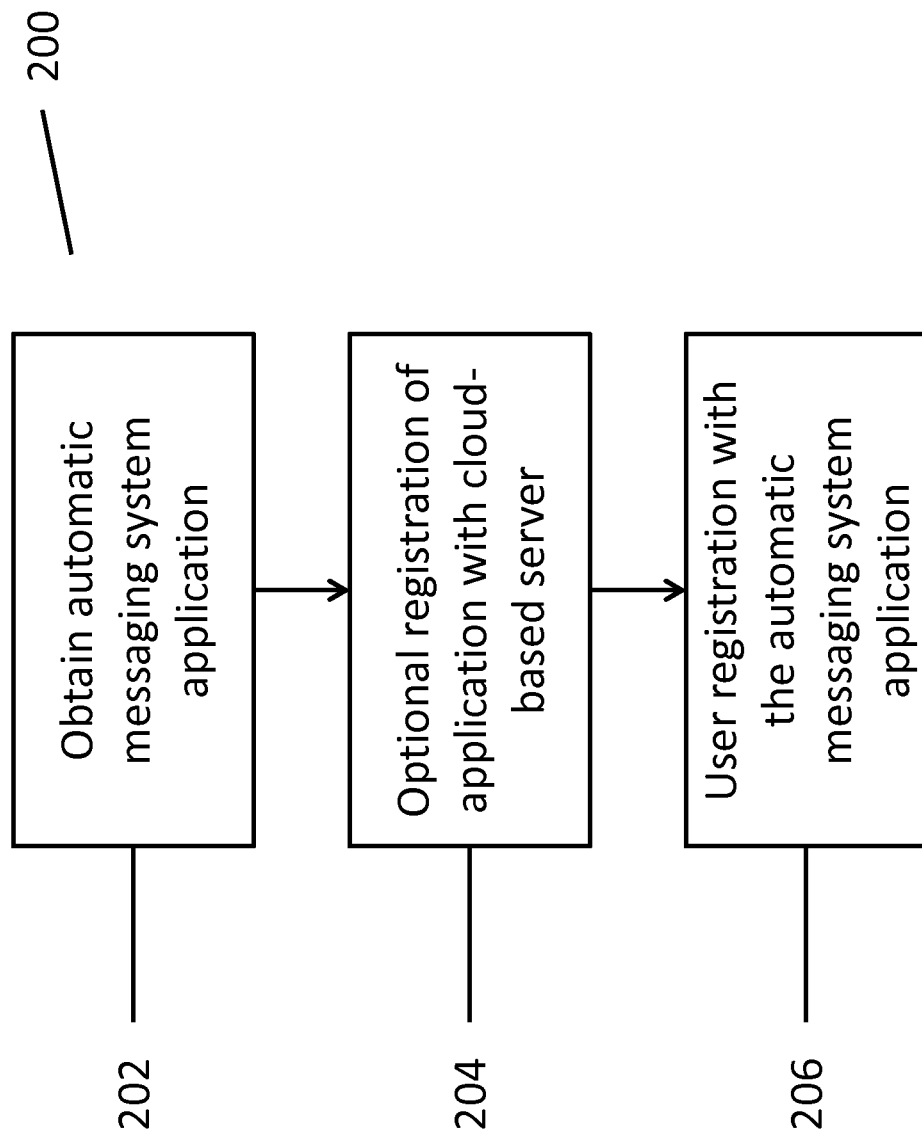
FIG. 2 is a flowchart showing an exemplary process of obtaining and initializing an automated messaging system application on a subscriber's mobile device.

FIG. 2 is a flowchart showing an exemplary process 200 of obtaining and initializing an automated messaging system application on a subscriber's mobile device (e.g., on mobile device 102 or 104). The process 200 is exemplary only and stages may be added, removed, altered, and/or reordered. In some embodiments, this process can be carried out when the automated messaging system application is first installed and/or activated on a mobile device.

At stage 202, the automated messaging system application can be obtained by a subscriber (e.g., John or Jill). For example, the messaging system application can be implemented as: i) an application that is downloaded and installed on a mobile device (e.g., from an app store), ii) the application can be part of and/or installed on a SIM card in the mobile device (for devices that use SIM cards), and/or iii) the application can be installed in the mobile device by the manufacturer of the device. In some embodiments, the application is installed such that it has access to call control events and/or other mechanisms by which it can tell that a call has been placed and whether the call was answered before it terminated. For example, in some embodiments, the application may not receive call control events, but notifications of the same from the mobile device operating system.

Referring now to stage 204, some embodiments of the automated messaging system application can employ a partial-cloud-based architecture. In these embodiments, the application on the subscriber's device can interact with a cloud-based portion of automated messaging system as described more fully below. A cloud-based architecture is not required and the application installed on a subscriber's device can be a self-contained application that includes all necessary functionality.

When a subscriber first installs the automated messaging system application (e.g., via a download and/or when subscribers buys a new SIM card from an operator with a pre-embedded application) and power cycles his or her handset, the automated messaging system application can send a registration message to a "cloud" server. As described in more detail below, the cloud server can check the device and determine if it should be blacklisted based on known handset bugs or other limitations (e.g., if a particular handset has a technical limitation that prevents the application from working correctly, that particular handset can be blacklisted), or if the subscriber needs any special settings based on communications with the mobile operator. These settings are then typically sent back to the automated messaging system application on the mobile device from the cloud. This registration can occur at handset start-up, after a phone event such as making a phone call or sending an SMS, and/or at other user-configurable times. In the case where the application is on the SIM card, the registration can occur when the subscriber purchases a new SIM card and places it in his or her mobile device for the first time. In this example, registration can occur either at handset start-up, or after a phone call is made or received, or after an SMS is sent. In some embodiments, the system can determine whether the handset make/model is blacklisted by using the International Mobile Station Equipment Identity (IMEI) and/or Type Allocation Code (TAC, which can be a subset of the IMEI) of the device to determine the handset type.

At stage 206, the automated messaging system application can automatically prompt the subscriber to opt-in and to enter his or her name (e.g., the application can display the message "Welcome to MessageXpress, would you like to participate? If so, please enter your name."). The subscriber's name (and other identifying information) can be stored within the application (e.g., on the SIM or in the mobile device 102/104 itself) so that it can be sent with each message without the user needing to type it each time. The prompt to enter a name (or other identifying information) can occur at handset start-up, via a menu selection if the subscriber selects the service via a SIM Toolkit menu item, upon application launch (in the scenario where the application is on the mobile device), and/or after a phone call. In some embodiments, rather than asking the subscriber if he or she wants to opt-in, the default can be to register the subscriber and then require the user to opt-out if he or she does not want to use the application. If the subscriber does not wish to use the application or service, the service would not automatically prompt the subscriber after missed calls. However, the service could still be re-activated (or disabled) via a menu option, and the subscriber can still receive messages from other users. In some embodiments, the opt-in and/or opt-out process is not initiated until after the automated messaging system application has determined that the mobile device on which it is installed is capable of supporting the automated messaging system. Exemplary processes for determining whether the mobile device is capable of supporting the automated messaging system is described in greater detail below in relation to FIGS. 3 and 4. The opt-in and opt-out process is optional and not required.

In some embodiments, a calling subscriber can also be notified prior to the initial messages being sent that his name will be shared with the called subscriber. Any billing information can also be displayed at this point in time (e.g., if there is a charge associated with using the automated messaging system).

While the foregoing focuses on an embodiment where the caller is automatically prompted to send a message after a missed call, the called party can also be automatically prompted in the same manner. For example, in some embodiments, the called subscriber can also benefit from the use of the automated messaging system application. If the called party has the application installed, the application can detect call control events associated with an incoming call followed by an indication that the call was not answered. This can cause the application in the called device to automatically trigger and prompt the called subscriber to send a message back to the calling subscriber.

Figure 3:
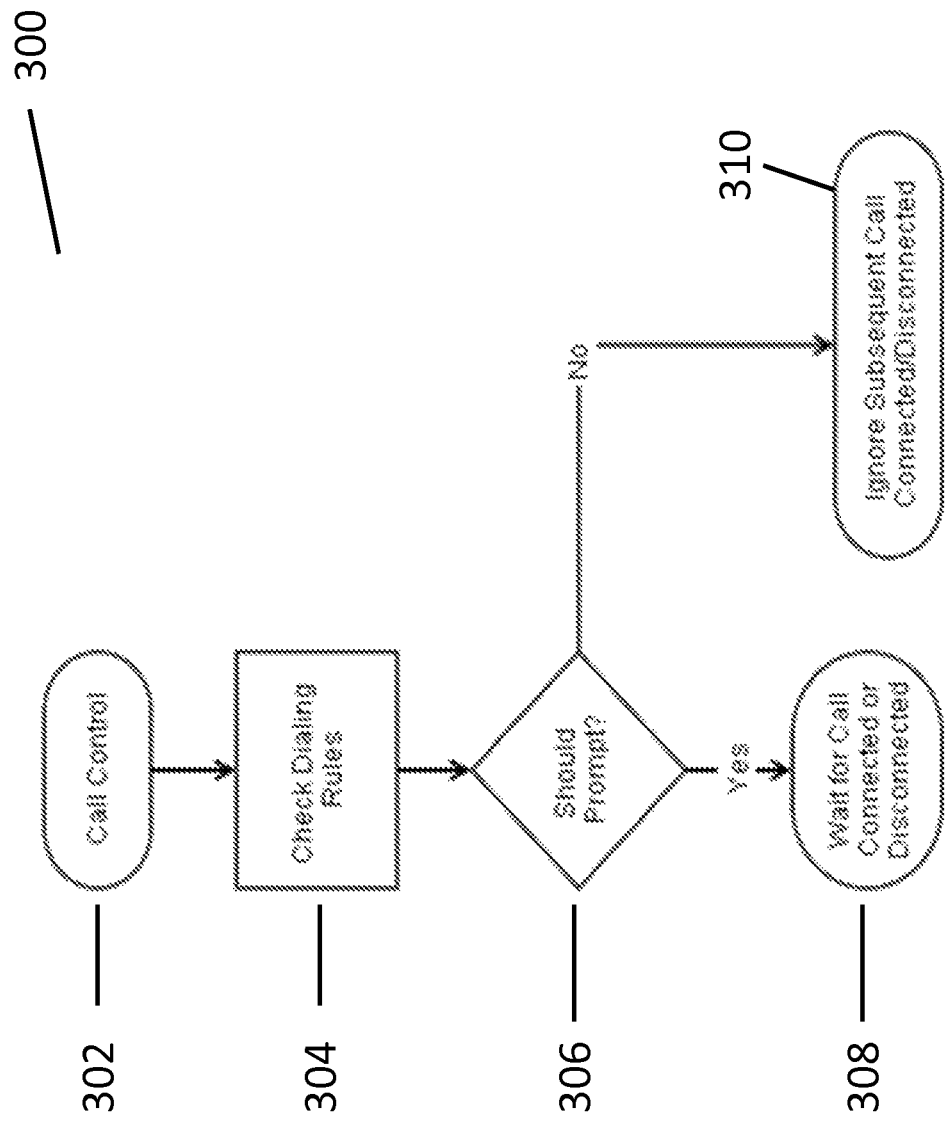
FIG. 3 is a flowchart illustrating an exemplary process for determining whether to trigger an automated messaging system installed on a mobile device.

FIG. 3 is a flowchart illustrating an exemplary process 300 for determining whether to "trigger" (e.g., initiate, turn-on, and/or activate) an automated messaging system application installed on a mobile device. The process 300 is exemplary only and stages may be added, removed, altered, and/or reordered.

At stage 302 ("Call Control"), the automated messaging system application can wait for a Call Control event (e.g., a notification indicating that a call has been initiated). When a Call Control event occurs, the automated messaging system application can be notified, and can also receive the dialed number associated with the call control event. Call Control events are described in greater detail below, and generally signify that a call has been initiated by a calling subscriber (e.g., the calling subscriber has dialed a number), but do not necessarily signify that the call has connected (e.g., that the called subscriber has picked up the call). Call Control events can be detected directly by the automated messaging system application, or be received by the application via a notification from a mobile phone operating system or a SIM Toolkit Framework (STK).

At stage 304 ("Check Dialing Rules), the automated messaging system application installed on the mobile device can check dialing rules. Dialing rules can be a set of rules and/or conventions regarding mobile subscribers' phone numbers, and can be used to infer information regarding the mobile subscribers' phone numbers. This information can, in some embodiments, affect whether the automated messaging system application initiates or not. For example, in countries where mobile devices have a dedicated area code that is different from fixed land-line numbers, the automated messaging system application can check if the number dialed in the call control event is a mobile number or fixed land-line number (e.g., based on the area code). In some embodiments, if the number is found to be a fixed number, the application can determine not to initiate and can remain silent. This step is not required and can be omitted in some embodiments.

While the above paragraph describes that the application installed on the mobile device checking the dialing rules, this is not required. Rather, the check can be performed by another component, such as a back end server in the network 106, which can then inform the application on the mobile device of the result.

At stage 306 ("Should Prompt"), the automated messaging system application decides whether to trigger or not (e.g., based on whether the called number is a mobile number that can accept messages). If the call is made to a mobile number, then the automated messaging system application can continue to stage 308, where the application triggers and waits for a subsequent "Call Connected" or "Call Disconnected" event. Otherwise (e.g., if the call is not made to a mobile number), then the automated messaging system application can branch to stage 310 where it can remain silent and ignore any subsequent "Call Connected" or "Call Disconnected" events.

FIG. 4 is a flowchart illustrating an exemplary process 400 by which the automated messaging system application can check whether the mobile device it is installed on can properly support the application. For example, the messaging system application can check whether the mobile device on which it is installed has the capability to differentiate between network originated call events and mobile device originated call events. By doing so, the messaging system application can differentiate between incoming and outgoing calls (as described more fully below) and only trigger on outgoing calls (if so desired). In some embodiments, if the mobile device is not able to differentiate between network originated and mobile device originated events, the device may not be compatible with the automated messaging system application, and the application can be fully or partially deactivated. In some embodiments, the process 400 is only performed one time when the application is first activated on a mobile device. The process 400 is exemplary only and stages may be added, removed, altered, and/or reordered.

At stage 401 ("Wait for Call Connected event"), the automated messaging system application on a mobile device can wait for a "Call Connected" event.

At stage 402 ("Call Connected"), the automated messaging system application on a mobile device can receive a "Call Connected" event from the mobile device, along with a dialed number. This event can be the result of, for example, a call to or from the mobile device connecting.

At stage 404 ("Was the event network originated?"), the automated messaging system application on the mobile device can check if the Call Connected event is network originated. If so, the call is an outgoing call because the "Call Connected" event was originated outside of the mobile device and received via the network 106. If the event is not network originated (meaning that the event is mobile device originated, indicating an incoming call), then the automated messaging system can branch to stage 410, at which time the automated messaging system can ignore the subsequent "Call Disconnected" event. After stage 410, the process 400 can continue back to stage 401 and wait for another Call Connected event. This can be because, in some embodiments, the application can be configured to ignore incoming phone calls.

At a general level, in embodiments that only trigger after outgoing calls, this technique can be useful to determine whether the mobile device can differentiate between incoming and outgoing calls (e.g., in devices that lack such a capability, all events will be interpreted as mobile device originated events). Stated differently, until the automated messaging system application actually receives a network originated event, it has no way of knowing whether the mobile device can differentiate between the two. Thus, in such embodiments, until the automated messaging system application receives a network originated event, it can continue to remain in an inactive state and not trigger.

At stage 406 ("Enable Messaging Support"), in some embodiments, if the automated messaging system application receives and identifies a network originated Call Connected event, the application can determine that the mobile device on which it is installed can distinguish between network originated and non-network originated call control events, and therefore supports the conditions for an embodiment that only triggers after outgoing calls.

At stage 408 ("Do not trigger . . . "), in some embodiments, the automated messaging system application can remain quiet at the end of this particular Call Connected event and does not trigger. It waits for the next Call Connected event (e.g., the automated messaging system application can be configured to trigger only on the first call after confirming that the device is capable of handling network originated call connected events).

Figure 5A:
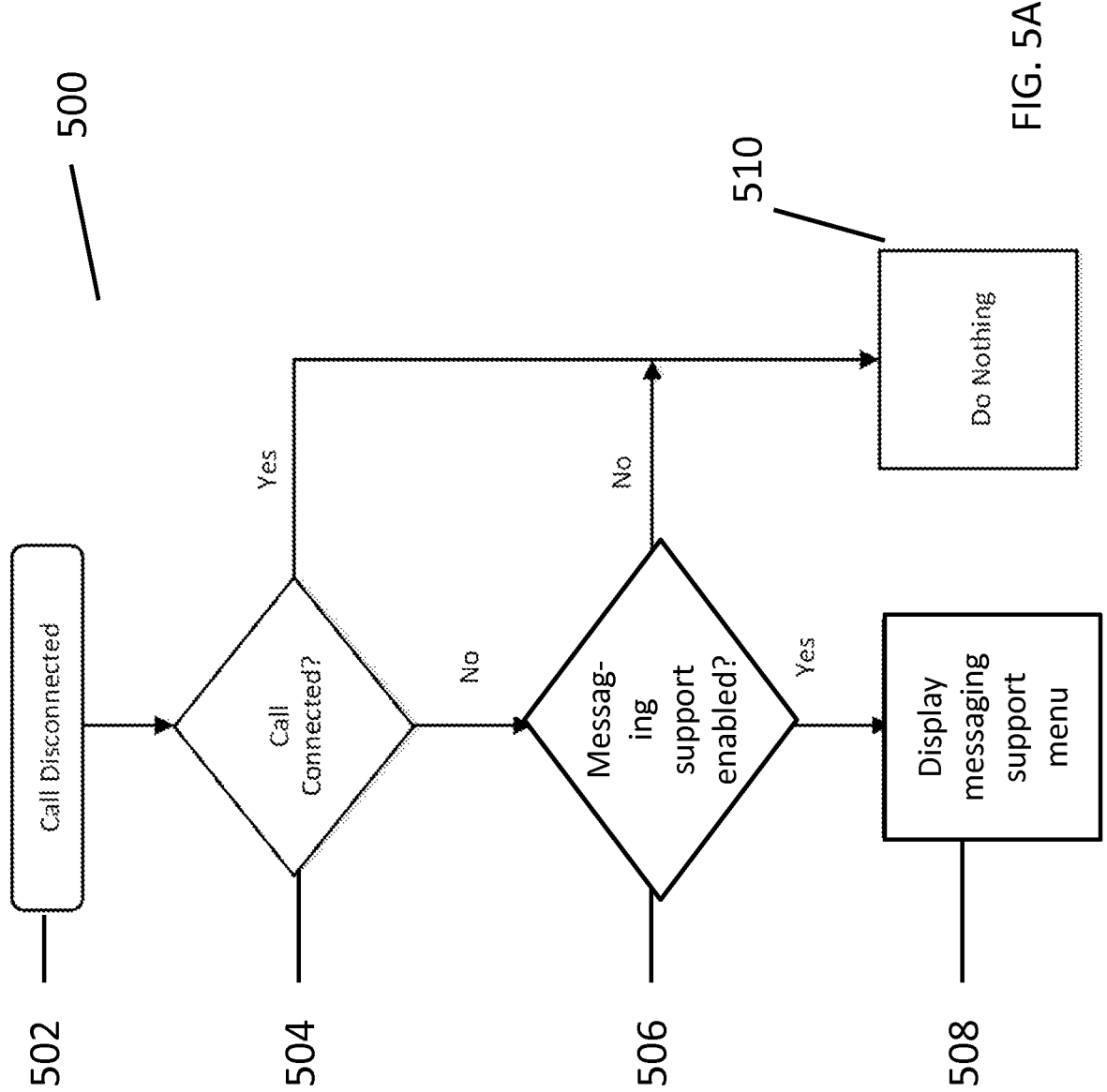
FIG. 5A is a flowchart illustrating an exemplary process by which an automated messaging system application can determine whether or not to display a messaging menu after a "Call Disconnected" event is received.

FIG. 5A is a flowchart depicting an exemplary process 500 by which the automated messaging system application can determine whether or not to automatically display a messaging menu. Process 500 can use call events, such as a "Call Disconnected" event, and the presence or absence of a "Call Connected" event, to infer whether a call was a missed call, and whether to display the messaging menu. The process 500 is exemplary only and stages may be added, removed, altered, and/or reordered.

At stage 502, ("Call Disconnected"), the automated messaging system application can receive a "Call Disconnected" event from the mobile device. This type of event can indicate that a connected call between two mobile devices has terminated and/or that an attempt to connect a call between two mobile devices has failed.

At stage 504 ("Call Connected?"), the automated messaging system application can check if the call had previously been connected before the Call Disconnected event was received. For example, the automated messaging system can check its memory and/or the memory of the mobile device on which it is installed, whether or not a "Call Connected" event was received prior to the "Call Disconnected" event, and whether the two events pertain to the same mobile number. If the call was connected, the automated messaging system can branch to stage 510 and remain silent. If the call was not connected, then the automated messaging system application can continue to stage 506. Additionally, during this stage (or another stage), the automated messaging system application can determine whether the Call Disconnected event was network originated or not. In embodiments that only trigger after outgoing calls, the process 500 can branch to stage 510 when the Call Disconnected event was not network originated.

In some cases, when a calling subscriber calls a subscriber who is not available, the calling subscriber can hear a message from the network operator. This audible message can state, for instance, that "the person you are calling now is busy," "the phone number you have dialed is not available," or some other message. In these cases, the fact that the calling subscriber hears a message from the network operator does not necessarily indicate that the call was "connected," and that a "Call Connected" event was generated and received. Since no "Call Connected" event is typically received for these types of network operator messages, the process 500 can continue to stage 506 upon receiving such a message.

At stage 506 ("Messaging support enabled?"), the automated messaging system application can check if messaging support is enabled for this mobile device. Messaging support can be enabled, for example, using the process discussed above in relation to FIG. 4. If messaging support for this mobile device is enabled, the process 500 proceeds to stage 508. Otherwise, the automated messaging system application branches to stage 510 and can remain silent.

At stage 508 ("Display Messaging Support Menu"), the automated messaging system application can automatically trigger and cause the display of its menu to the subscriber on the display of the mobile device. That is, the menu can be displayed without any further action by the user, solely as a result of receiving the Call Disconnected event without receiving a Call Connected event. As discussed above, the menu can give the calling subscriber a list of options for messaging the called subscriber, for example:

Send A Message:
Call me back
I will be late
I am waiting
Where are you?
New message
Customize (e.g., mobile subscribers can change these messages and enter their own text)

At this point, the user can select one of the displayed menu options (e.g., "Call me back"). After making a selection, the automated messaging system application can cause the mobile device to generate and send a message (e.g., via the network 106). The connection to the network 106 can be accomplished in many different ways and the messages can be transported using various methods (e.g., SMS, MMS, USSD, iMessage, Facebook message, Tweets, e-mails, and/or data communication channels). In some embodiments, the automated messaging system application can supplement (or cause the mobile device or network to do so) the message with additional information such as the caller's name, phone number, date/time, and other supplementary information.

As described in further detail below, the user can customize one or more of these displayed menu options. Once customized or personalized, these choices can automatically appear after any subsequent missed call. For example, a user could change "Where are you?" to "Have a great day!" After every missed call, the "Have a great day" option can automatically appear as a selection. While some or all of the menu options may be customizable, some or all of the menu options can also be locked out by a system administrator of the automated messaging system application so that users can no longer customize them. For example, a service administrator may wish to limit personalization of some of the menu items.

The user can also create a message to be displayed along with the default menu options. For example, the user could create a new message saying "I can't make it" by selecting the "New message" option from the above menu. Once created, this new message can automatically appear after any subsequent missed call.

The displayed menu options and their associated messages can also vary depending on the date. For example, the automated messaging system application can be configured to add the message "Happy New Year" to the list of menu options if the current date is between December 26 and January 15. Once the current date is no longer in the date range December 26 to January 15, the list of menu options presented to the user can revert to the default set of options. The current time and date can be collected remotely from a remote server, from the operating system of the mobile device, or from incoming messages targeted to the mobile device.

FIG. 5B is a flowchart depicting another exemplary process 530 by which the automated messaging system application can determine whether or not to automatically display a messaging menu. Process 530 can use one or more elements or devices within the mobile operator's network to determine whether a call is a missed call. The process 530 is exemplary only and stages may be added, removed, altered, and/or removed. This process can apply, for example, when a call connects to voicemail (which may fool the calling device into thinking that the call connected).

At stage 532, a network element in the mobile operator's network can determine that a call has disconnected without connecting to the called subscriber, e.g., that a missed call has occurred. For example, a switch in the mobile operator's network, a Home Location Register (HLR), a sub-switch, a Mobile Switching Center (MSC), a billing center (BC), a voice mail system (VMS), or any other network element in the mobile operator's network that enables call completion and missed call detection can be used to detect a missed call. An example of this would be a component within Verizon Wireless' network informing the mobile handset that a missed call occurred.

In some cases, depending on the telecommunications standard being utilized by the mobile operator's network, a voicemail call (e.g., a call in which the calling subscriber reaches the called subscriber's voicemail, but does not speak directly to the called subscriber) may not be categorized as a "missed call." This may be because a voicemail call can generate a "Call Connected" event when the called subscriber reaches the called subscriber's voicemail, even though the two subscribers never spoke directly. In such cases, certain network elements configured to detect "missed calls" may not be able to distinguish between a "voicemail call" and a regular phone call in which two subscribers speak directly. In such cases, a mobile operator's network element, such as the voicemail system, can detect that a "voicemail call" has occurred and classify it as a "missed call." That is, for example, a "voicemail call" can be considered a type of missed call. Both can be considered actionable calls in that they can both be used to trigger the automatic messaging system application on the calling subscriber's mobile device to display its messaging menu.

At stage 534, the mobile operator's network can inform an automatic messaging system server (e.g., a cloud server) that a missed call or a voicemail call has occurred. This can be done via an Application Program Interface (API), or other notification method. The mobile operator network can also inform the mobile device directly, without involving the automatic messaging system server.

At stage 536, the mobile operator's network can pass the called subscriber's phone number, the calling subscriber's phone number, the time of the missed call, and/or the date of the call to the automatic messaging system server (and/or directly to the mobile device). This can also be done via an API.

At stage 538, the automatic messaging system server can send a message to the automatic messaging system application on the calling subscriber's device. This message can take many forms and can include, for example, a binary SMS message, a USSD command, an SMS that is not displayed to the user (e.g., a class 2 SMS message), or a specialized data packet. This message can instruct the automatic messaging system application on the calling subscriber's device to prompt the calling subscriber with messaging menu. In embodiments where the a messaging system server is not used, the mobile operator network can send a notification directly to the mobile device (including the applications installed therein) using any of the foregoing messaging types.

At stage 540, in response to the message received from the automatic messaging system server indicating that a missed call (including a voicemail call) occurred, the automatic messaging system application on the calling subscriber's device can automatically display its messaging menu. This menu (and the process that follows) can be similar to the menu described above in relation to stage 508 in FIG. 5A.

Figure 6:
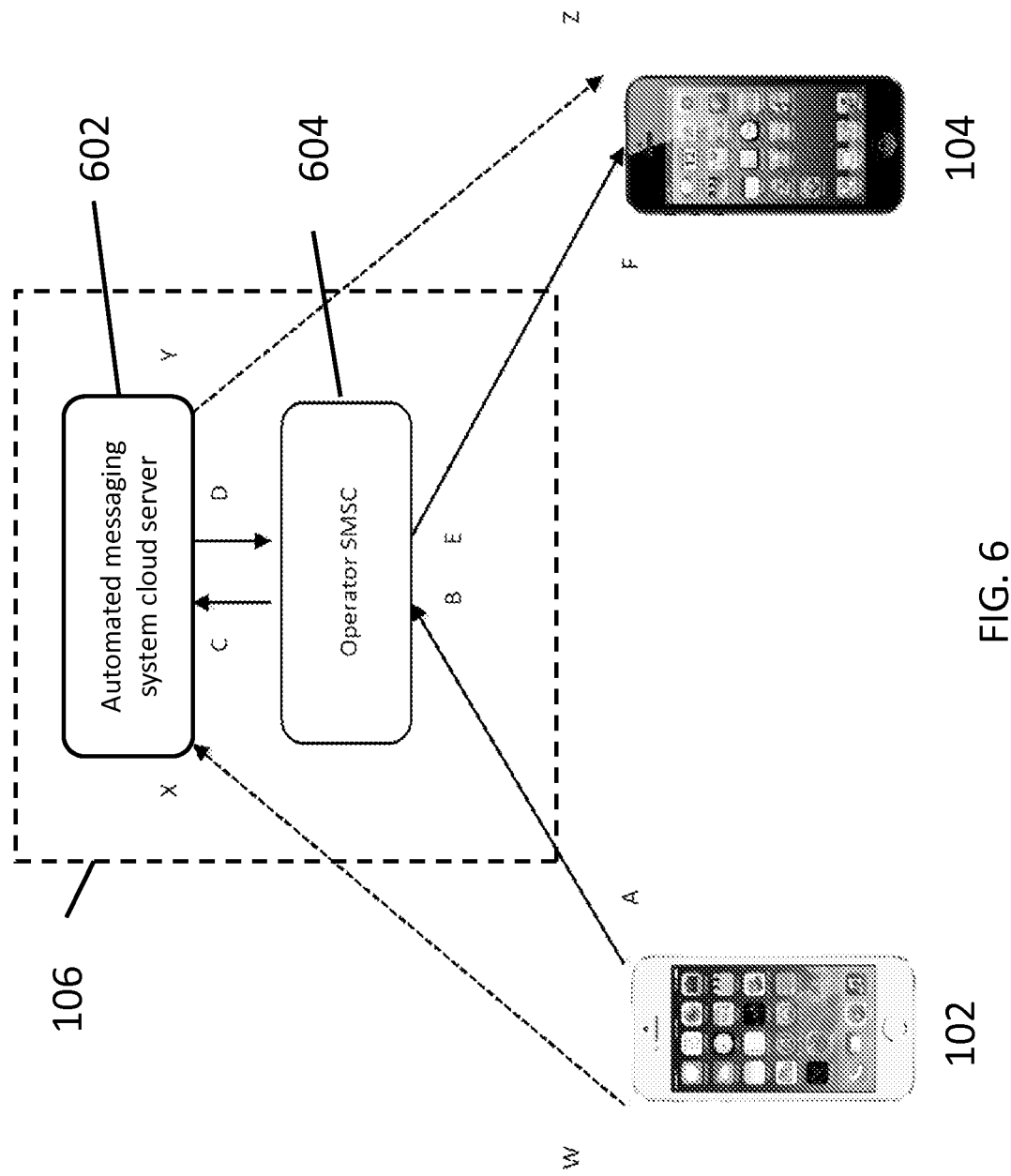
FIG. 6 is a logical block diagram illustrating components and data flows of the exemplary mobile phone system of FIG. 1 in greater detail.

FIG. 6 is a logical block diagram that illustrates exemplary components and data flows of the mobile phone system of FIG. 1 in greater detail. FIG. 6 includes the first subscriber's mobile device 102, the second subscriber's mobile device 104, and the network 106. In this embodiment, the network 106 further includes two subcomponents: automated messaging system cloud server 602 and operator short message service center ("SMSC") 604. Other embodiments are possible.

The automated messaging system cloud server 602 can be configured to interact with the automated messaging system applications installed on one or both of mobile devices 102 and 104. For example, a message sent from mobile device 102 for mobile device 104 can first be routed through the automated messaging system cloud server 602. The cloud server 602 can maintain a list of addresses and/or delivery channels associated with different mobile devices. When cloud server 602 receives the message from mobile device 102, cloud server 602 can look up a preferred delivery mechanism and/or address for mobile device 104, and forward the message to the appropriate delivery mechanism and/or address. In one embodiment, for example, cloud server 602 can determine that mobile device 104 prefers to receive messages in SMS format, iMessage format, Facebook post format, email format, Tweet format, or other formats. In some embodiments, the list can be kept to reflect a hierarchical preferred order. Cloud server 602 can also determine when a message sent to mobile device 104 needs to be reformatted in order to display correctly (e.g., because mobile device 104 is of a different device type or employs a different mobile device operating system than the sending mobile device 102). In such cases, cloud server 602 can reformat the message so that it will display correctly on mobile device 104. For example, the cloud server 602 can reformat an iMessage received from the mobile device 102 into an ordinary text message (e.g., where the mobile device 102 is an Apple device and the mobile device 104 is a Samsung device).

Cloud server 602 can also be configured to remotely change the pre-programmed messages stored on mobile devices 102 and 104. For example, an administrator at cloud server 602 can determine to change the pre-programmed message "I will be late" to "I am coming." The change to the pre-programmed message can include changing the way the message appears to the calling subscriber on the menu (e.g., changing the phrase "I will be late" to "I will be coming"), or it can merely change the phrase associated with a menu item while leaving the menu item unchanged (e.g., leaving the phrase "I will be late" unchanged as it appears in the menu to the calling subscriber, but changing the contents of the message sent to the called subscriber if the calling subscriber selects the "I will be late" option. For instance, whereas the message sent to the called subscriber might have previously stated "I will be late," it might now say "I have been delayed."). The administrator at cloud server 602 can delete messages (e.g., removing the pre-programmed message "Where are you?" from the list of options presented), or add new messages (e.g., adding the new message "I can't make it."). In some embodiments, cloud server 602 can change and/or add messages that are appropriate to certain times of the year, such as "Happy Holidays," "Merry Christmas," or "Happy New Year." Cloud server 602 can also add, change, or delete settings on the automatic messaging system applications installed on subscriber's phones that cause those applications to display certain messages when the current date falls within certain date ranges. For example, where the automatic messaging system applications might originally have presented subscribers with the menu option "Happy Holidays" when the current date is between December 20 and December 31, cloud server can remotely and automatically change both the associated date range (e.g., changing the range to December 21 through December 25), as well as the associated menu option (e.g., changing "Happy Holidays" to "Merry Christmas"). This change does not have to occur within the specified date range, but can happen at any time.

In some embodiments, the changes can be pushed to mobile devices 102 and 104 automatically without any input required from the users of mobile devices 102 and 104. These changes can be communicated to mobile devices 102 and 104 via messages of different formats, such as binary SMS format, USSD, iMessage, MMS, or other types of data packets. In some embodiments, mobile devices 102 and 104 can be configured to notify users of the mobile devices 102 and 104 that a change is being pushed to those devices from cloud server 602. In some embodiments, mobile devices 102 and 104 can ask their users for permission to change its pre-programmed messages to match new pre-programmed messages received from cloud server 602. The cloud server 602 can also be configured to supplement the messages is handles with additional information such as additional content (e.g., adding a phone number to the message), adding a timestamp, and/or adding a caller's name.

The operator SMSC 604 can be responsible for delivering voice and data messages between the mobile devices 102 and 104. In some embodiments, operator SMSC 604 can receive messages from mobile device 102 and forward those messages to cloud server 602. Operator SMSC 604 can also receive messages from cloud server 602 and forward those messages to mobile device 104.

Next is one example of how the system shown in FIG. 6 can operate, although other configurations are possible. While the following discussion focuses on SMS and MMS messages, the disclosed subject matter is not limited to this and other message types can be used.

As described above, after the first subscriber (e.g., mobile device 102) calls the second subscriber (e.g., mobile device 104), and the second subscriber does not answer the call, the first subscriber can automatically be presented with the option to send an SMS or MMS message to the second subscriber. When the first subscriber chooses to send a message to the second subscriber after a missed call, the message can follow the following route:

The automated messaging system application within the mobile device 102 can forward a message (Reference A) to a designated short code at Operator's SMSC 604. This can occur, for example, over a cellular, WiFi, or hardwired network connection. The content of the message can be one of the predetermined messages presented to the first subscriber and/or a custom message. In some embodiments, the application within the mobile device 102 can be configured to supplement the chosen message with addition information (e.g., if the user chooses "call me back" as the message, the application can supplement this with the name of the first subscriber, the date/time, and a callback number).

At Reference B the message is received at the operator SMSC 604. The SMSC 604 can be operated by, for example, the cellular network operator (e.g., Verizon).

The operator SMSC 604 can forward the incoming message to automated messaging system cloud server 602 (Reference C).

Automated messaging system cloud server 602 can transform the message by reformatting it to display properly on the called subscriber's mobile device 104, and can forward the reformatted message back to the operator SMSC 604 (Reference D). In some embodiments, the automated messaging system cloud server 602 can also be configured to supplement the message with additional content.

The operator SMSC 604 can forward the (re)formatted message to the mobile device 104 (Reference E). The SMSC 604 can forward the message as, for example, an SMS message.

At Reference F, the mobile device 104 receives the automated messaging system message and processes it. Processing can include, for example, notifying the second subscriber that a message has been received and displaying the message to the second subscriber. In some embodiments this can be handled by an automated messaging system application installed in the mobile device 104 and/or by the mobile device 104 itself. For example, if there is no automated messaging system application in the mobile device 104, the mobile device 104 can process the message as an ordinary text message.

In embodiments of the automated messaging system that use data networks (e.g., 3G, LTE networks) rather than SMS or MMS messages, the following connectivity structure and dataflows can be used. That is, some embodiments can rely solely on a data network connection rather the supplementary services provided by the mobile operator. For example, by sending a message over a data connection (e.g., an iMessage or e-mail), subscribers can avoid using up their allotted SMS messages.

In such an embodiment, when the first subscriber (e.g., the calling subscriber on the mobile device 102) sends an automated messaging system message to the second subscriber (e.g., the called subscriber on the mobile device 104), the message can follow the following route:

The automated messaging system application within mobile device 102 can send the message directly to the automated messaging system cloud server 602 (e.g., by sending the message to an IP address corresponding to the automated messaging system cloud server 602), thereby bypassing the operator SMSC 604 (Reference W). As noted above, the automated messaging system application can also supplement the information contained in the message.

At Reference X, the automated messaging system cloud server 602 receives the message.

The automated messaging system cloud server 602 can transform the message by reformatting it to display properly on the called subscriber's mobile device 104, and can forward the formatted message to the destination mobile device 104 (Reference Y). In some embodiments, the automated messaging system cloud server 602 can also be configured to supplement the message with additional content.

At Reference Z, the mobile device 104 receives the automated messaging system message from the cloud server 602 and processes it. Processing can include, for example, notifying the second subscriber that a message has been received and displaying the message to the second subscriber. In some embodiments this can be handled by an automated messaging system application installed in the mobile device 104 and/or by the mobile device 104 itself. For example, if there is no automated messaging system application in the mobile device 104, the mobile device 104 can process the message as an ordinary iMessage or e-mail.

In some embodiments of the system shown in FIG. 6, one or more of the components therein can be configured to determine (or be informed) whether the called subscriber also has the automated messaging system application installed. If so, messages sent to the called subscriber's mobile device can be formatted/enhanced to provide additional features and/or functionality to the calling and called subscribers. For example, on the one hand, if no automated messaging system application is installed on the called subscriber's phone, the message delivered can be formatted (and ultimately displayed) as an ordinary text message. On the other hand, if the automated messaging system application is installed on the called subscriber's device, then the application can receive enhanced messages that cause enhanced functionality on the called subscriber's device (e.g., special presentation of the message, a sound being played, a special prompt, read receipt being sent to the calling subscriber, automatic reply message prompts being presented to the called subscriber, etc.).

For example, the automated messaging system server can check to determine if the called subscriber also has the automated messaging system application installed and enabled on his or her phone. If the automated messaging system application is installed and enabled by the called subscriber, then the automated messaging system server may optionally format and/or enhance the message sent to the called subscriber in such a manner that the application on the called subscriber's mobile device can interpret the message and perform a set of various configurable functions such as playing an alert tone, displaying the message, forwarding a notification to another phone number, or returning the message to the automated messaging system server for reformatting if it is received in a user interface language that the called subscriber has not designated as a default. If the called subscriber has the automated messaging system application installed and enabled on his mobile device, the server may also format and/or enhance the message sent to the called subscriber in a manner that is related to the device type of the called subscriber. Users with smartphone devices may receive enhanced messages with more content, or the messages may be sent as MMS messages, emails, or other data-enhanced messages.

The above embodiments are exemplary and other configurations are possible. For example, while this application discusses "client," "cloud," and "server" functionality, some of all of this functionality can be combined into a single application (e.g., located on a mobile device, located only in the cloud, and/or only located on a server). Additionally, while the above descriptions focus on the calling subscriber sending a message to the called subscriber, the reverse is also possible. For example, after missing a call, the called subscriber can be automatically presented with the same options described above for the calling subscriber.

Protocols, platforms, and hardware that can be used to implement each of the exemplary processes discussed above in relation to FIGS. 1-6 will now be described in greater detail.

During calls between mobile devices, the mobile device can register various events relating to the status of the call. For example, the following events are possible:

A phone number is dialed (e.g., which can cause a "Call Control" event)

The call is connected (e.g., which can cause a "Call Connected" event)

The call is disconnected (e.g., which can cause a "Call Disconnected" event)

As described more fully below, these events can be network originated or mobile originated. Additionally, each of these events can include supplemental information such as the dialed phone number and/or timestamp information.

Which events are registered can vary depending on what happens during a particular call. For example, in a typical mobile call from a calling subscriber to a called subscriber where the called subscriber answers the call, the operating system of the calling subscriber's mobile device can register the following events:

A phone number is dialed (e.g., which can cause a "Call Control" event)

The call is connected (e.g., which can cause a "Call Connected" event)

The call is disconnected (e.g., which can cause a "Call Disconnected" event)

However, if a calling subscriber attempts to dial a called subscriber, but the called subscriber does not pick up and the call attempt terminates (e.g., because the called subscriber is busy), the operating system of the calling subscriber's mobile device can register the following events:

A phone number is dialed (e.g., which can cause a "Call Control" event)

The call is disconnected (e.g., which can cause a "Call Disconnected" event).

Therefore, in some embodiments, the mobile device of a calling subscriber can distinguish between a regular phone call that successfully connects and an unsuccessful attempt by the calling subscriber to connect with a called subscriber by determining whether or not a "Call Connected" event occurred between the "Call Control" event and the "Call Disconnected" event. While the above description focuses on "Call Control," "Call Connected," and "Call Disconnected" events, these events may go by other names in when implemented in a cellular network. For example, if the relevant information (e.g., a calling be dialed, connecting, or disconnecting) can be inferred from an occurrence in the system, it can be considered one of the Call Control, Call Connected, and/or Call Disconnected events. Exemplary embodiments of these events are defined by, for example, the standards provided by 3GPP.

As noted above, some embodiments of the automated messaging system use an application that is installed on a subscriber's mobile device's operating system. In such embodiments, the automated messaging system application typically starts (e.g., launches or activates) when the subscriber dials a number (e.g., after a "Call Control" event). In some embodiments (e.g., if the application is part of the mobile device operating system), the automated messaging system application can register two events: 1) outgoing call event with number information and status (connected, rejected, etc.), and 2) call disconnected event (e.g., so that the automated messaging system application is notified when these events occur). The automated messaging system application can collect the dialed number from the event and can save it for future use. At this point, the automated messaging system application can become active and can wait for the next event to happen. The mechanism by which the automated messaging system application is notified of the call events can vary. For example, rather than registering certain events directly, the application can be notified of call events by the operating system and/or other mechanisms.

Thus, in an exemplary embodiment, the calling subscriber can trigger a Call Control event by dialing a telephone number. In embodiments where the automated messaging system application is installed on a mobile device that uses a SIM card, the Call Control event can pass the dialed number to a SIM Toolkit Framework (STK). The STK can maintain a list of one or more applications that are registered to receive notifications of Call Control events from the STK. The automated messaging system application can be registered as one of those applications on the list. Therefore, when the STK receives the Call Control event and the dialed number, the STK can forward that information to the automated messaging system application.

If the call is connected, the mobile device typically issues a "Call Connected" event and informs the automated messaging system application (either directly or indirectly through, for example, the STK, as described above). If the "Call Connected" event is the event issued after the "Call Control" event (e.g., the event associated with dialing a number), then the automated messaging system application can determine that this is a regular phone call that successfully connected as opposed to an unsuccessful connection attempt. In such situations, the automated messaging system application can terminate.

If the call is disconnected without a call connection, the mobile device typically issues the "Call Disconnected" event after the Call Control event and informs the automated messaging system application (either directly or indirectly). This will typically cause the automated messaging system application to automatically trigger a screen prompt to the caller when this happens (e.g., to prompt the caller to send a message).

The automated messaging system application can differentiate between mobile equipment originated events and network originated events. For example, if a call from a calling subscriber to a called subscriber is connected, the calling subscriber typically receives the corresponding Call Connected event from the network, rather than having it originate from the calling subscriber's device itself. Thus, by differentiating between mobile equipment originated events and network originated events, the automated messaging system application can determine whether the call is an incoming call or an outgoing call. In systems that support network originated Call Control events, the automated messaging system application can also differentiate between incoming and outgoing calls by determining whether the Call Control event was mobile equipment Originated or network originated. The application can also differentiate between incoming and outgoing calls in other ways as well.

The events (or handlers) can be implemented differently depending on the operating system of a mobile device. For example, the abovementioned events can be implemented in a way that one event can be responsible for sending the number dialed and a second, separate event can be responsible for informing about the state of the call (e.g., RINGING, IDLE, OFF HOOK, etc.). By changing the sequence of different states and events (or handlers), the automated messaging system application can identify incoming, outgoing, and connected calls and then decide to trigger after disconnected calls without a connection.

The events described in this patent application are based upon current GSM and 3GPP mobile standards. These standards are continually enhanced as new technologies become available. A new standard defining a "Missed Call" event can also be defined, such that it will no longer be necessary to track the sequence of "Call Control" events, "Call Connected" events and "Call Disconnected" events to infer whether a missed call has occurred. If a Missed Call event is defined, the mobile device can simply be configured to detect when such a Missed Call event is received, and trigger its messaging menu accordingly. All other processes described herein could still apply in this scenario.

For embodiments where the application messaging system application is installed on a SIM system, the automated messaging system application can be registered with the SIM Tool Kit Framework (STK) to receive "Call Control", "Call Connected" and "Call Disconnected" events. STK informs the automated messaging system application each time these events occur. The automated messaging system application can start with the Call Control event that signals a dialing event. If the automated messaging system application receives the Call Disconnected event without receiving the Call Connected event, then the application can automatically trigger a prompt on the screen on the calling party's phone.

In some embodiments, the operation of the application can be thought of as follows:
- If a Call Control event followed by a Call Connected event is received, then do not trigger the application.
- If a Call Control event and a Call Disconnected event is received, then automatically trigger the application and ask the user whether he or she wants to send a message to the called party.
- When a Call Disconnected event happens without a Call Connected event, this condition can automatically trigger the application and prompt the user to send a message to the called party.

While the description above discusses the automated messaging system application receiving certain call control events, the application does not need to receive the actual event itself. For example, in some embodiments, the mobile device operating system can receive the call events, and rename/repackage the event before providing it to the application.

Whether the automated messaging system application is on the device Operating System or embedded to the SIM card, if a Call Control event followed by a Call Disconnected event is received without an intervening Call Connected event, the application can automatically trigger a prompt on the screen of the mobile device of the calling subscriber.

Figure 7:
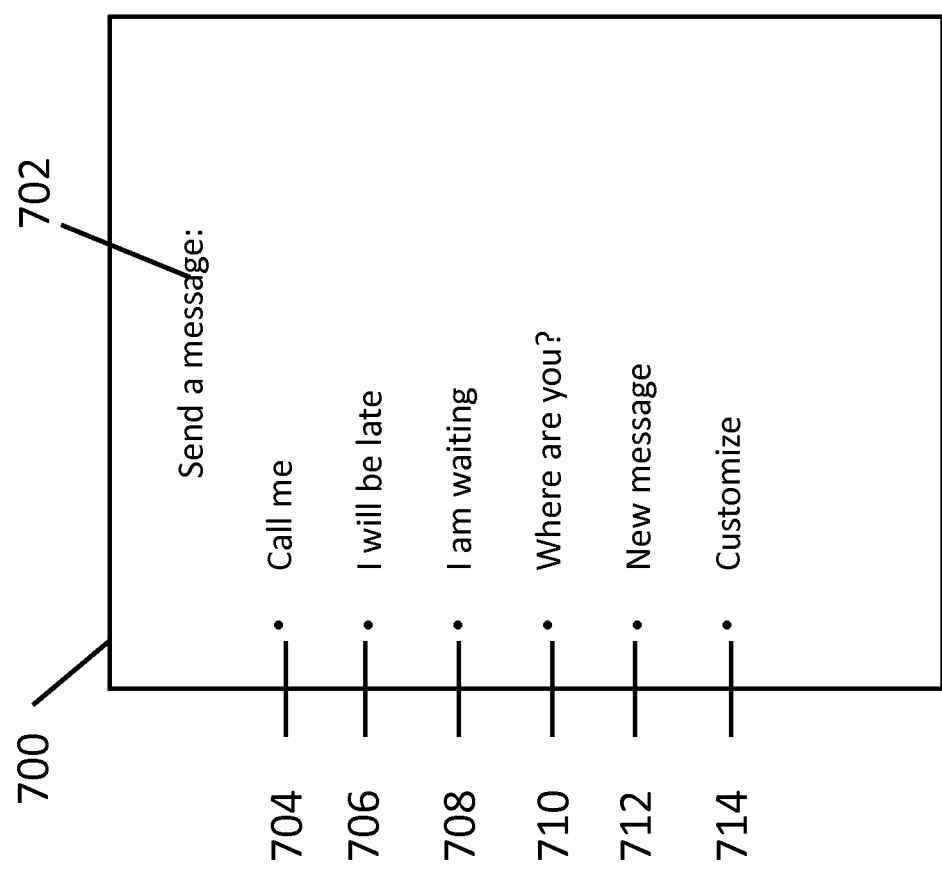
FIG. 7 illustrates an exemplary mobile device screen displaying a menu showing different messaging options.

FIG. 7 shows an exemplary mobile device screen 700 displaying a menu showing different phrases that can be included in a message, according to some embodiments. FIG. 7 includes a non-actionable header 702 that states "Send a Message". FIG. 7 also includes a plurality of actionable (also referred to as selectable) menu items, including an item for "Call me" 704, "I will be late" 706, "I am waiting" 708, "Where are you?" 710, "New message" 712, and "Customize" 714. Pressing each of the actionable menu items 704, 706, 708, and 710 can cause the device to automatically send a message containing the selected phrase to the called subscriber. The automated messaging system application can be downloaded to the mobile device or embedded on the SIM card with several most-commonly used messages pre-populated. For example, if the calling subscriber selects menu item "Call me" 704, the calling subscriber's mobile device can send a message stating "Call me" to the called subscriber. Similarly, if the calling subscriber selects menu item "I will be late" 706, the calling subscriber's mobile device can send a message stating "I will be late" to the called subscriber. Actionable menu items 708 and 710 can function in the same way. By providing the calling subscriber wither a menu of pre-set messages to send to the called subscriber, the automated messaging system application can make it easier for the calling subscriber to send messages, without having to type them in. In some embodiments, the user can select more than one phrase to include in the message.

If none of the messages associated with actionable menu items "Call me" 704, "I will be late" 706, "I am waiting" 708, and "Where are you?" 710 are appropriate, the calling subscriber can select menu item "New message" 712. When this menu item is selected, the automated messaging system application can display a new screen in which the calling subscriber can compose a new message to the called subscriber.

The "customize" menu item 714, as discussed in more detail below, can allow mobile subscribers to change the messages associated with items 704, 706, 708, 710, and 712, for example, by allowing mobile subscribers to edit the pre-set messages and/or add their own additional text.

If the calling subscriber selects the "customize" menu item 714, the automated messaging system application can cause one or more new screens to appear. In some embodiments, the screens can appear sequentially, one by one. The first screen can display:

Message 1:
"I will be late"
[blank data entry form]

The subscriber can type a new message in the blank entry form and change the message. For example, he can type "What's up?".

Then the second screen can appear as follows:
Message 2:
"I am waiting"
[blank data entry form]

The subscriber can add a new message by typing a new message or can choose to keep the same message.

Then, the third screen can appear:
Message 3:
"Where are you?"
[blank data entry form]

Again, the subscriber has the option to edit this message and replace it with a new message by typing a new message or instead has the option choose to keep the same message.

Message 4:
"New message"
[blank data entry form]

In this case, the subscriber has the option to create a new message by typing a message and then send it.

In addition to having screens appear sequentially, the automated messaging system application can also allow the calling subscriber to specify which message he or she would like to customize, and jump directly to a screen that customizes the selected message. The automated messaging system can also display all or a subset of the customizing screens simultaneously. In yet other embodiments, the automated messaging system can allow the calling subscriber to customize more than one message at once.

The subscriber preferably has the option to send any one of the messages at the end of a call, which is disconnected without a connection. For example:

John calls Jill from his mobile phone. Jill's phone rings. Jill is busy; she does not answer the call. On John's phone screen (John is the Calling Party), the following list of options can automatically appear:

Send A Message:
Call me back
I will be late
I am waiting
Where are you?
New message
Customize Assuming John chooses the "Call me back" option from the menu, at this point, the automated messaging system application typically parses this menu selection and prepares a message. There are different scenarios as a follow up to this case:

In a first set of embodiments, if the application is set up to communicate and interact with an automated messaging system cloud server (e.g., see FIG. 6), then the automated messaging system application installed on the calling subscriber's mobile device (e.g., John's mobile device) preferably has the cloud servers' destination address within its memory. This address can be a short code number at Mobile Operators' SMS center where the cloud server is connected or can be an IP address. For simplicity, the following paragraph explains an exemplary embodiment of how the service works for the SMSC connections.

The automated messaging system application takes the calling subscriber's (e.g., John's) menu selection, prepares a binary SMS message and includes the following information: Calling Subscriber's Name (John Smith), Personalized message's destination (Called Subscriber's mobile phone number, in this case, Jill's mobile phone number), and message content (e.g., "Call me back").

Then, the application sends the information to the automated messaging system cloud server destination address (e.g., short code at the operator SMSC 604, in FIG. 6). The transmission of this information can correspond to Reference A in FIG. 6. When the message reaches the short code at the SMSC (Reference B in FIG. 6), the SMSC forwards this message to the automated messaging system cloud server 602 (Reference C in FIG. 6). In an exemplary embodiment, short codes (which are also known as short numbers) can be special telephone numbers, significantly shorter than full telephone numbers, that can be used to address SMS and MMS messages from certain service providers' mobile phones or fixed phones. There are typically two types of short codes: dialing and messaging. A similar concept for voice calls is typically known as abbreviated dialing.

When the message is received by the automated messaging system cloud server, the message can be parsed and the following information can be compiled:

Name of the Caller: John Smith
Mobile Phone Number of the receiving party: +1(617) 777-7777
(Jill's number)
Message Content: Call me back This supplemental information can be collected via different means. For example, the automated messaging system application installed on the calling subscriber's mobile device can automatically collect the calling subscriber's name (e.g., saved during the opt-in I opt-out I registration process) and the called subscriber's name (e.g., from the calling subscriber's mobile device's address book), and send it to the automated messaging system cloud server. Additionally, the calling subscriber's name, once manually entered by the user into the application during registration, can be sent once to the cloud server, and not re-sent with every message. The names of the calling and the called subscriber can also be collected by the cloud server via integration into a mobile network operator's billing platform or customer base management systems. For example, the cloud server could submit a request to a network element in the mobile operator's network, and request the subscriber name associated with a specific phone number. The cloud server can also obtain the name(s) of the calling and/or the called subscriber from a SMSC (Short Message Service Center). During the process of sending a message from one device to another, the device itself and/or components in the network 106 can be used to add the supplemental information to the message.

In addition, the following can also be captured from the incoming message:

Caller's Mobile Phone Number: +1 (508) 555-5555
Event Time: 9:15 AM

Then, the automated messaging system cloud server 602 can prepare the following new message:

"I called you at 9:15 AM, could not reach you.
Please call me back.
John Smith
+1 (508) 555-5555"

Then, the automated messaging system cloud server 602 can send this message to the Operator SMSC 604 for delivery to the destination phone number +1 (508) 555-5555. The transmission of this message can correspond to Reference D in FIG. 6.

The Operator SMSC 604 can then forward this prepared message to Jill's phone (e.g., Reference E in FIG. 6). Jill's phone receives this message (e.g., Reference F) and displays to her the following message in the format that is sent:

"I called you at 9:15 AM, could not reach you.
Please call me back.
John Smith
+1 (508) 555-5555"

If John were to select "I will be late" from the application menu, then, the message would follow the same path and would arrive to Jill's phone as follows:

"I will be late.
John Smith
+1 (508) 555-5555"

In a second set of embodiments, the automated messaging system application can also be set up as a stand-alone application. In such embodiments, the process for transmitting messages from the calling subscriber to the called subscriber can be different.

The automated messaging system application can take the calling subscriber's (e.g., John's) menu selection (e.g., "call me back"), and prepare a message with the following information: Calling Subscriber's Name (e.g., John Smith), Personalized message's destination (e.g., Called Subscriber's mobile phone number, in this case, Jill's mobile phone number), and message content (e.g., "Call me back").

The stand-alone automated messaging system application can thus have the following information:

Name of the Caller: John Smith
Mobile Phone Number of the receiving party: +1(617) 777-7777
(Jill's number)
Message Content: Call me back
Caller's Mobile Phone Number: +1 (508) 555-5555
Event Time: 9:15 AM Then, the automated messaging system application can send (e.g., as an SMS, MMS) the message to the called subscriber's phone number (Jill's number which is +1 (617) 777-7777).

Jill's phone receives this message and typically displays to her the following message in the format that is sent:

"I called you at 9:15 AM, could not reach you.
Please call me back.
John Smith
+1 (508) 555-5555"

Turning back to the general description of embodiments of the disclosed subject matter, in some embodiments, in order to avoid false prompts due to mobile devices' lack of support for network events, the automated messaging system application can validate each mobile device on which it is installed. For example, prior to any screen prompts, the automated messaging system application can check if the calling party's device supports the proper call related network events. When the first call happens after the initial device start up, the automated messaging system application can wait for the proper three events to happen in the usual sequence:

1. Dial a number
2. Call Connected
3. Call Disconnected

If these three events happen and it is reported to the application by the mobile device (and/or the operating system), the automated messaging system application can assume that this device supports the relevant network events (e.g., the Call Connected and related network events). Until these three events are successfully reported to the automated messaging system application and are confirmed by the automated messaging system application, the automated messaging system application can remain silent (e.g., until the automated messaging system application can confirm compatibility of the mobile device, the automated messaging system application can operate in standby mode such that the subscriber cannot see the application or the related prompts).

As discussed above, in a first set of embodiments, the automated messaging system can have two components:

1. Automated messaging system application installed on a subscribers' mobile device
2. One or more automated messaging system servers (potentially implemented as cloud servers).

Although, in some embodiments, the messaging system servers can be omitted and the calling device can send a message directly to the called device.

The automated messaging system application installed on the mobile device can be embedded in the mobile device operating system, can be installed on the device operating system, and/or can be on the SIM card. The automated messaging system application can check the network events related to the calls (e.g., dialing a number, connecting a call, disconnecting a call). Depending on the chain of events during a call, the automated messaging system application can include the logic to automatically trigger or to not automatically trigger a prompt on the mobile device screen of the calling subscriber. The automated messaging system application can also have the intelligence to automatically prompt the calling subscriber if the call is disconnected without a call connected event. The automated messaging system application can have the intelligence to collect the calling subscriber's name. The automated messaging system application can also have the intelligence to collect the device type from the calling subscriber's mobile device. The automated messaging system application can have the intelligence to communicate with the automated messaging system server via a network connection.

The automated messaging system application can have the intelligence to monitor the use of the automated messaging system by the subscriber. For example, if the subscriber is not using the automated messaging system (e.g., not sending messages), the automated messaging system application can ask the subscriber if he or she wants to terminate the service. If the subscriber chooses to send messages to the other party after a call without a connection, the automated messaging system application can include the intelligence to automatically prompt the calling subscriber with a list of pre-defined phrases to send as a message. If the subscriber wants to customize his or her frequently used messages, the automated messaging system application can allow the subscriber to customize his or her messages, and can store these customized messages for future use. The messages can be transported from the calling subscriber to the called subscriber via various methods (e.g., SMS, MMS, USSD, iMessage, Facebook message, Tweet, e-mail, and/or data communication channels).

The one or more automated messaging system servers (which can be implemented as cloud servers) can have the intelligence to communicate with one or more of the automated messaging system applications installed on subscribers' mobile devices. The server can collect the device type of the respective mobile devices and can send a message to the respective applications to "turn off" the automated messaging system application in mobile devices that have known issues and/or bugs that interfere with the automated messaging system. The server can have the intelligence to receive messages and forward them to the called subscriber's address (which can be collected by the automated messaging system application). The server can collect the time of the respective call events and embed these times into the forwarded message. The time of the event is collected from the Mobile Operator SMSC message header. Each time, the Mobile Operator SMS center forwards an automated messaging system message (coming from an application), there is a time stamp within each message header. The automated messaging system server parses the header and determines the time of the event. The server can determine the type of device associated with the destination address and can format the message according to a format that is suitable for the destination equipment. For example, if the message is sent by a feature phone such as Nokia device, but the destination address correspond to an iPhone, the server can format the message so that it will display properly on an iPhone. This way, the service provides interoperability in between different mobile devices.

The automated messaging system application can also be used to send, in response to a call not being completed, pre-defined pictures and/or videos in addition to (or in place of) the messages described above. These pictures and/or videos can be shown to the called/calling subscriber in a small footprint after an unsuccessful connection attempt, and the called/calling subscriber can be asked to send these pictures and images at the end of the phone calls. This can automate and simplify the photo/video sharing process in between mobile devices. In some embodiments, the photo/video sharing can be two-ways. For example, the called subscriber's device can detect that a call was received, without being answered (e.g., by monitoring call control events on the called device), and if so, automatically prompt the called subscriber to share photos/videos, and even send a message back to the calling subscriber). In some embodiments the automated messaging system application can be configured to automatically prompt the called subscriber to send a photo/video and/or reply message back to the calling subscriber in response to receiving a photo/video and/or message from the calling subscriber.

In some embodiments, the automated messaging system application can be configured to determine whether the called number is a number capable of accepting messages (e.g., a mobile phone number, a Skype number, a Google Voice number, a Comcast "land-line" that can receive text messages). If the number is capable of accepting messages, then the automated messaging system application can trigger as described above. If not, the automated messaging system application can prevent itself from prompting the calling subscriber to send a message. For example, if a caller calls a landline phone that is not capable of receiving text messages, then the automated messaging system application can prevent itself from automatically triggering after a call. This determination can be made using, for example, black lists and white lists.

In some embodiments, even if the called number is not capable of accepting messages, if the application has a corresponding alternate e-mail address or phone number associated with the called subscriber that is capable of receiving messages, then the application can still trigger as usual. The automated messaging system application can determine whether (and how) a called number is capable of receiving a message using a central clearinghouse (e.g., the cloud server). Devices can register with the clearinghouse to indicate whether they are capable of receiving messages, what type of messages can be received, and/or what applications are in use on the device (e.g., by indicating that Facebook is in use on a device, the automated messaging system application can know that this device is capable of receiving Facebook messages). The automated messaging system can also be configured to collect e-mail address and other communication addresses (e.g., Skype, Facebook) at which a subscriber can receive messages. As a working example: the calling subscriber's mobile device can determine whether the called subscriber's device is capable of receiving messages via a first delivery channel, such as SMS or MMS messages. This determination can be done by comparing the called subscriber's phone number against a set of dialing rules, or by consulting a central clearinghouse (such as a database maintained at an automated messaging system server). If the called subscriber's device is capable of receiving messages via the first delivery channel, the calling subscriber's mobile device can send its message using the first delivery channel. If, however, the called subscriber's device is not capable of receiving messages via the first delivery channel, the calling subscriber's mobile device can determine if the called subscriber's mobile device is capable of receiving messages via alternate delivery channels, such as email, Facebook, or Twitter.

This determination can also be performed by consulting the central clearinghouse. If the calling subscriber's device determines that the called subscriber's device is capable of accepting messages in a second delivery channel (e.g., e-mail), the calling subscriber's device can send its message using this second delivery channel (e.g., the calling device can send an e-mail directly from an e-mail client on the mobile device). If the called subscriber's device can accept messages in multiple different delivery channels, the calling subscriber's device can pick which delivery channel to use based on a pre-programmed hierarchy of preferred delivery methods (e.g., a hierarchy that prioritizes email over Facebook, which is in turn prioritized over Twitter). As used herein, the term "delivery channel" can be thought of as alternate methods for transferring a message from a first device to a second device, wherein each channel has different capabilities and methods for presenting content.

At each time a subscriber is asked to send an automated messaging system message, he or she has the option not to send any message. The automated messaging system can have the intelligence to count the number of rejections and based thereon, can ask the subscriber if he or she would like to opt-out of the service if the service is not being used. The opt-out counters for the subscribers who have used the service and for the subscribers who has never used the service can be different. For example, if the subscriber has never sent any message, after 3 (three) times he chooses not send a message; he will be shown a screen to opt-out of the service. If, however, the subscriber has sent a message, before this counter can be set to 6 (six).

Figure 8:
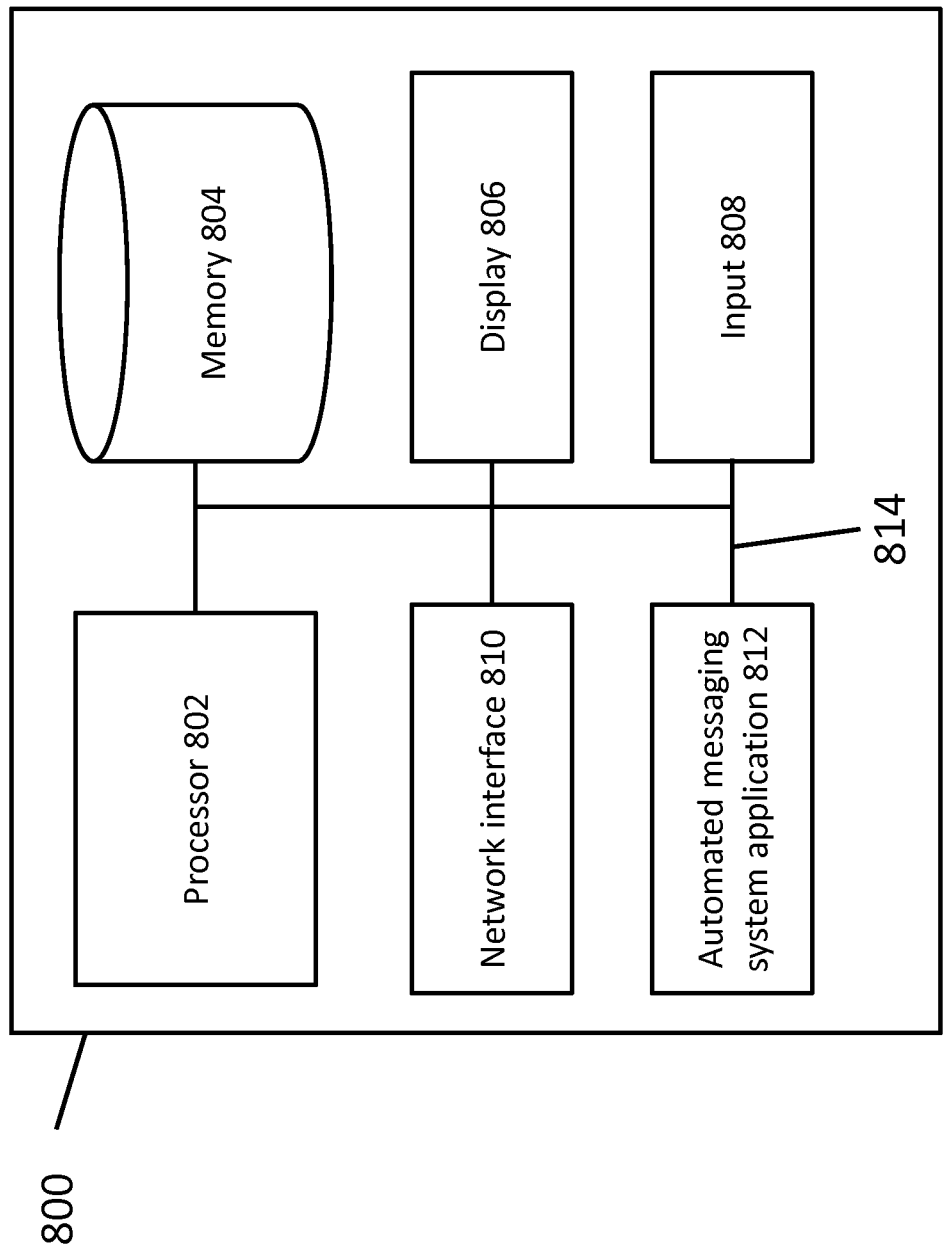
FIG. 8 is a block diagram illustrating exemplary components of a subscriber's mobile device on which an automated messaging system application has been installed.

FIG. 8 is a block diagram showing exemplary components of a subscriber's mobile device 800 on which an automated messaging system application has been installed, in accordance with some embodiments. FIG. 8 includes processor 802, memory 804, display 806, input 808, network interface 810, and automated messaging system application 812. Each of these components can be connected, directly or indirectly (e.g., through intervening components) with at least some of the other components via internal bus 814.

Processor 802 can include any special-purpose or general-purpose processor capable of executing instructions. Examples of processors can include special purpose logic circuitry, a FPGA (field programmable gate array), a microprocessor, a microcontroller, an arithmetic logic unit (ALU), and/or an ASIC (application-specific integrated circuit). While a "processor" is discussed here, it is to be understood that in some embodiments a "processor" can include multiple processors.

Memory 804 can include any storage memory capable of storing data and/or computer readable instructions, including all forms of volatile and non-volatile memory (e.g., EPROM, EEPROM, RAM, ROM, magnetic disks, flash memory devices, optical disks, etc.).

Display 806 can include any component that conveys information to a user, including a display screen, a set of indicator lights, an audio speaker that provides audio output, and/or a haptic mechanism that provides feedback to a user in the form of tactile vibrations.

Input 808 can include any component that can receive user input, such as a keypad, buttons, a trackball, a mousepad, a camera, or a microphone via which a user can provide spoken or audible input. In some embodiments, display 806 and input 808 can be combined into an actionable touch-screen that can both display data and receive user input.

Network interface 810 can be used by the mobile device to send data to and receive data from an external network, such as network 106 in FIG. 1. Network interface 810 can include, for example, a wireless transceiver configured to send and receive cellular, Bluetooth, RFID, infrared, or other types of wireless signals.

Memory 804 can store instructions that can be executed by processor 802 to implement a mobile device operating system (not shown), as well as applications that run on the mobile device operating system. In some embodiments, the automated messaging system application 812 can be one of these applications. Although automated messaging system application 812 is depicted as a separate component in FIG. 8, automated messaging system application 812 can be implemented purely as a set of instructions stored on memory 804, and not as a tangible hardware component. In other embodiments, the automated messaging system application 812 can be implemented on a SIM card or other specialized, physical hardware component that interfaces with processor 802 and memory 804 via internal bus 814.

The automated messaging system application 812 can work in conjunction with processor 802, memory 804, display 806, input 808, and network interface 810 to implement any of the processes described above.

For example, the automated messaging system application 812 can work in conjunction with any of the components described above to implement the process of obtaining and initializing the automated messaging system application discussed above in relation to FIG. 2. When the automated messaging system is implemented as an application that is downloaded and installed on the mobile device (e.g., from an app store), the application can be downloaded via network interface 810 and stored in memory 804. In embodiments involving a cloud server that checks the device to determine if it should be blacklisted, information regarding the device's technical specifications and configurations can be stored in memory 804, and can be relayed to the cloud server via processor 802 and network interface 810. Information provided by the subscriber during the opt-in or opt-out process, such as the subscriber's name I identifying information, or billing information, can be received by the mobile device via input 808 and saved in memory 804.

The automated messaging system application 812 can also work in conjunction with any of the components described above to implement the process for determining whether to "trigger" the automated messaging system application discussed above in relation to FIG. 3. The automated messaging system application 812 can detect call control events associated with the mobile device directly, e.g., by interfacing directly with the network interface 810. Alternatively, the automated messaging system can receive notifications of call control events from the mobile device operating system implemented by processor 802 and memory 804. Also, as described above, the automated messaging system application 812 can receive notifications of call control events from a SIM Toolkit Framework (STK). The dialing rules discussed above, which can be used to, for example, look up whether a called phone number corresponds to a mobile device or a fixed land-line device can also be stored in memory 804.

The automated messaging system application 812 can also work in conjunction with any of the components described above to determine whether the mobile device on which it is installed has the capability to differentiate between a network originated and a mobile device originated call event (e.g., as discussed above in relation to FIG. 4). Similarly, the automated messaging system application 812 can also work with any of the components described above to determine whether or not to display the messaging menu when a "Call Disconnected" event is received (e.g., as discussed above in relation to FIG. 5).

In some embodiments, memory 804 can contain a record of previous call events (e.g., "Call Control" events, "Call Connected" events, and "Call Disconnected" events). In some embodiments, this record of previous call events can also include the phone number(s) and time(s) associated with each call event. The automated messaging system application 812 can access these records stored in memory 804 to determine whether a "call disconnected" event is associated with a previously received "call connected" event, in order to determine whether to display the menu of pre-set messages for the called subscriber.

As another example, automated messaging system application 812 can store in memory 804 certain configurations, settings, and indications. For example, memory 804 can store an indication that the mobile device supports the conditions for the automated messaging system application to operate, and that the automated messaging system is therefore enabled for future call control events (e.g., memory 804 can store an indication regarding whether the mobile device is capable of understanding a Network Originated call connected event). Memory 804 can include records of customized messages received from a subscriber, so that the mobile device can use the customized messages in the future. Memory 804 can also include a record of the number of times a subscriber has rejected prompts to send pre-set messages, such that the automated messaging system application can prompt the user after a certain number of rejections whether or not the subscriber would like to continue using the automated messaging system. For embodiments that rely on Operator's SMSC 604 to forward sent messages, memory 804 can be used to store the designated short code for Operator's SMSC 604. For embodiments in which the automated messaging system application can communicate directly with the automated messaging system cloud server 602, memory 604 can be used to store an IP address or other address information pertaining to the automated messaging cloud server 602.

Other embodiments are within the scope and spirit of the disclosed subject matter.

The subject matter described herein can be implemented in digital electronic circuitry, or in computer software, firmware, or hardware, including the structural means disclosed in this specification and structural equivalents thereof, or in combinations of them (including SIM cards). The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

While "missed calls" are described herein, this term is broad and can cover situations where a call was attempted from a first user to a second user and, for some reason, the call did not connect. For example, each of the following can be considered missed calls: i) the second user does not answer the call, ii) the call goes to the second user's voicemail instead of being answered by the second user, iii) the mobile network operator intercepts the call and plays a notice to the first user, and iv) a call that does not connect due to billing issues.

Additionally, the specification herein refers to calls "disconnecting." This does not require that a call actually connect before it can disconnect. For example, when a first user attempts to call a second user and the first user hangs up before the second user answers, the call can "disconnect" and a missed call can result. As another example, a call can disconnect when it is answered by a voicemail system rather than being answered by the second party.

One or more references is incorporated by reference herein. To the extent that the incorporated information conflicts with the present application, the present application shall control.

What is claimed is:

1. A computer-implemented method for automatically prompting a calling user to send a message to a called user over a wireless cellular or data network of a Mobile Operator, the calling user using a calling mobile device and the called user using a called mobile device, the method comprising:
   detecting, at an element, server, or hardware of the wireless cellular or data network of the Mobile Operator, that a call from the calling mobile device to the called mobile device was a missed call;
   retrieving, at an element, server, or hardware of the wireless cellular or data network, the Mobile Station International Subscriber Directory Number (MSISDN) of the calling mobile device;
   sending, from an element, server, or hardware of the wireless cellular or data network, a first message to the calling mobile device comprising first instructions to display a menu having a plurality of selectable menu items, wherein at least one of the selectable menu items corresponds to a stored phrase.

2. The method of claim 1, wherein the first instructions further comprise second instructions to launch an automatic messaging application and to cause the automated messaging application to display the menu having a plurality of selectable menu items.

3. The method of claim 2, further comprising
   receiving, at an element, server, or hardware of the wireless cellular or data network, a second message addressed to the called mobile device, wherein the second message comprises one of the stored phrases.

4. The method of claim 3, further comprising
   determining, at an element, server, or hardware of the wireless cellular or data network, a delivery channel associated with the called mobile device; and
   sending the second message to the determined delivery channel.

5. The method of claim 4, wherein the delivery channel is selected from the group consisting of SMS, iMessage, Facebook post, email, and Tweet.

6. The method of claim 4, further comprising
   receiving, at an element, server, or hardware of the wireless cellular or data network, a device type of the called mobile device.

7. The method of claim 6, further comprising
   determining, at an element, server, or hardware of the wireless cellular or data network, whether the second message will display correctly on the called mobile device or if the second message needs to be reformatted to display correctly on the called mobile device.

8. The method of claim 1, wherein the first message further comprises instructions for the automatic messaging application to display a menu having a plurality of selectable menu items, at least some of the selectable menu items corresponding to new stored phrases contained in the first message.

9. The method of claim 1, wherein the first message is sent using the MSISDN of the calling mobile device.

10. The method of claim 1, further comprising
    receiving, at an element, server, or hardware of the wireless cellular or data network, a communication comprising the Mobile Station International Subscriber Directory Number (MSISDN) of the called mobile device.

11. The method of claim 10, further comprising
    determining, at an element, server, or hardware of the wireless cellular or data network, if the called mobile device has an automatic messaging application installed.

12. The method of claim 1, wherein the network element is selected from the group consisting of a switch in the Mobile Operator's network, a Home Location Register (HLR), a sub-switch, a Mobile Switching Center (MSC), a billing center (BC), and a voice mail system (VMS).

* * * * *